United States Patent
Dalli et al.

(10) Patent No.: US 11,055,616 B2
(45) Date of Patent: Jul. 6, 2021

(54) ARCHITECTURE FOR AN EXPLAINABLE NEURAL NETWORK

(71) Applicant: UMNAI Limited, Ta' Xbiex (MT)

(72) Inventors: Angelo Dalli, Floriana (MT); Mauro Pirrone, Kalkara (MT)

(73) Assignee: UMNAI Limited, Ta' Xbiex (MT)

( * ) Notice: Subject to any disclaimer, the term of this patent is extended or adjusted under 35 U.S.C. 154(b) by 0 days.

(21) Appl. No.: 16/950,711

(22) Filed: Nov. 17, 2020

(65) Prior Publication Data

US 2021/0150341 A1 May 20, 2021

Related U.S. Application Data

(60) Provisional application No. 62/936,716, filed on Nov. 18, 2019, provisional application No. 62/964,840, filed on Jan. 23, 2020.

(51) Int. Cl.
*G06N 3/08* (2006.01)
*G06N 3/063* (2006.01)
(Continued)

(52) U.S. Cl.
CPC ............ *G06N 3/08* (2013.01); *G06N 3/0454* (2013.01); *G06N 3/063* (2013.01); *G06N 5/003* (2013.01); *G06N 5/022* (2013.01)

(58) Field of Classification Search
CPC ........ G06N 3/08; G06N 3/0454; G06N 3/063; G06N 5/003; G06N 5/022
See application file for complete search history.

(56) References Cited

U.S. PATENT DOCUMENTS 4,979,126 A 12/1990 Pao et al.
7,480,640 B1 1/2009 Elad et al.
(Continued)

FOREIGN PATENT DOCUMENTS

WO 97/14113 A2 4/1997

OTHER PUBLICATIONS

Joel Vaughan, Agus Sudjianto, Erind Brahimi, Jie Chen, and Vijayan N. Nair, "Explainable Neural Networks based on Additive Index Models", Jun. 5, 2018, arXiv, pp. 1-11. (Year: 2018).*
(Continued)

*Primary Examiner* — Kamran Afshar
*Assistant Examiner* — Ying Yu Chen
(74) *Attorney, Agent, or Firm* — Maier & Maier, PLLC

(57) ABSTRACT

An architecture for an explainable neural network may implement a number of layers to produce an output. The input layer may be processed by both a conditional network and a prediction network. The conditional network may include a conditional layer, an aggregation layer, and a switch output layer. The prediction network may include a feature generation and transformation layer, a fit layer, and a value output layer. The results of the switch output layer and value output layer may be combined to produce the final output layer. A number of different possible activation functions may be applied to the final output layer depending on the application. The explainable neural network may be implementable using both general purpose computing hardware and also application specific circuitry including optimized hardware only implementations. Various embodiments of XNNs are described that extend the functionality to different application areas and industries.

29 Claims, 18 Drawing Sheets

(51) Int. Cl.
G06N 5/02 (2006.01)
G06N 5/00 (2006.01)
G06N 3/04 (2006.01)

(56) References Cited

U.S. PATENT DOCUMENTS

| | | | |
|---|---|---|---|
| 7,542,960 | B2 | 6/2009 | Basak et al. |
| 10,210,452 | B2 | 2/2019 | Szatmary et al. |
| 10,311,368 | B2 | 6/2019 | Lokare et al. |
| 2019/0147369 | A1* | 5/2019 | Gupta ............... G06N 5/045 706/12 |
| 2019/0156216 | A1* | 5/2019 | Gupta ............... G06N 5/045 |
| 2019/0197357 | A1* | 6/2019 | Anderson ........... G06K 9/6262 |
| 2019/0370647 | A1* | 12/2019 | Doshi ................ G06N 3/08 |
| 2020/0073788 | A1 | 3/2020 | Saha et al. |
| 2020/0152330 | A1* | 5/2020 | Anushiravani ....... G06N 20/10 |
| 2020/0167677 | A1* | 5/2020 | Verma ............... G06N 5/003 |
| 2020/0279140 | A1* | 9/2020 | Pai .................. G06N 20/00 |
| 2020/0349466 | A1* | 11/2020 | Hoogerwerf ......... G06N 3/08 |

OTHER PUBLICATIONS

David Alvarez-Melis and Tommi S. Jaakkola, "Towards Robust Interpretability with Self-Explaining Neural Networks", Dec. 3, 2018, arXiv, pp. 1-16. (Year: 2018).*

Udo Schlegel, Hiba Arnout, Mennatallah El-Assady, Daniela Oelke, and Daniel A. Keim, "Towards a Rigorous Evaluation of XAI Methods on Time Series", arXiv, Sep. 17, 2019, pp. 4321-4325. (Year: 2019).*

Na Lu, Yidan Wu, Li Feng, and Jinbo Song, "Deep Learning for Fall Detection: Three-Dimensional CNN Combined With LSTM on Video Kinematic Data", Feb. 20, 2018, IEEE Journal of Biomedical and Health Informatics, vol. 23, No. 1, pp. 314-323. (Year: 2018).*

K.-L. Du, "Clustering: A neural network approach", 2010, Neural Networks 23, pp. 89-107. (Year: 2010).*

Clement Farabet, Camille Couprie, Laurent Najman, and Yann LeCun, "Learning Hierarchical Features for Scene Labeling", published online Oct. 17, 2012, IEEE Transactions on Pattern Analysis and Machine Intelligence, vol. 35, No. 8, pp. 1915-1929. (Year: 2012).*

Keneni et al., "Evolving Rule-Based Explainable Artificial Intelligence for Unmanned Aerial Vehicles", Jan. 15, 2019, IEEE Access, vol. 7, p. 17001-17016. (Year: 2019).*

Jie Chen et al., "Adaptive Explainable Neural Networks (AxNNs)", https://arxiv.org/abs/2004.02353, Published Apr. 2020, 25 pages.

Jacob Kauffmann et al., "From Clustering to Cluster Explanations via Neural Networks", arXiv:1906.07633v1 [cs.LG] Jun. 18, 2019, 14 pages.

Alejandro Barredo et al., "Explainable Artificial Intelligence (XAI): Concepts, Taxonomies, Opportunities and Challenges toward Responsible AI", arXiv:1910.10045v2 [cs.AI] Dec. 26, 2019, Reprint submitted to Information Fusion on Dec. 30, 2019; 72 pages.

* cited by examiner

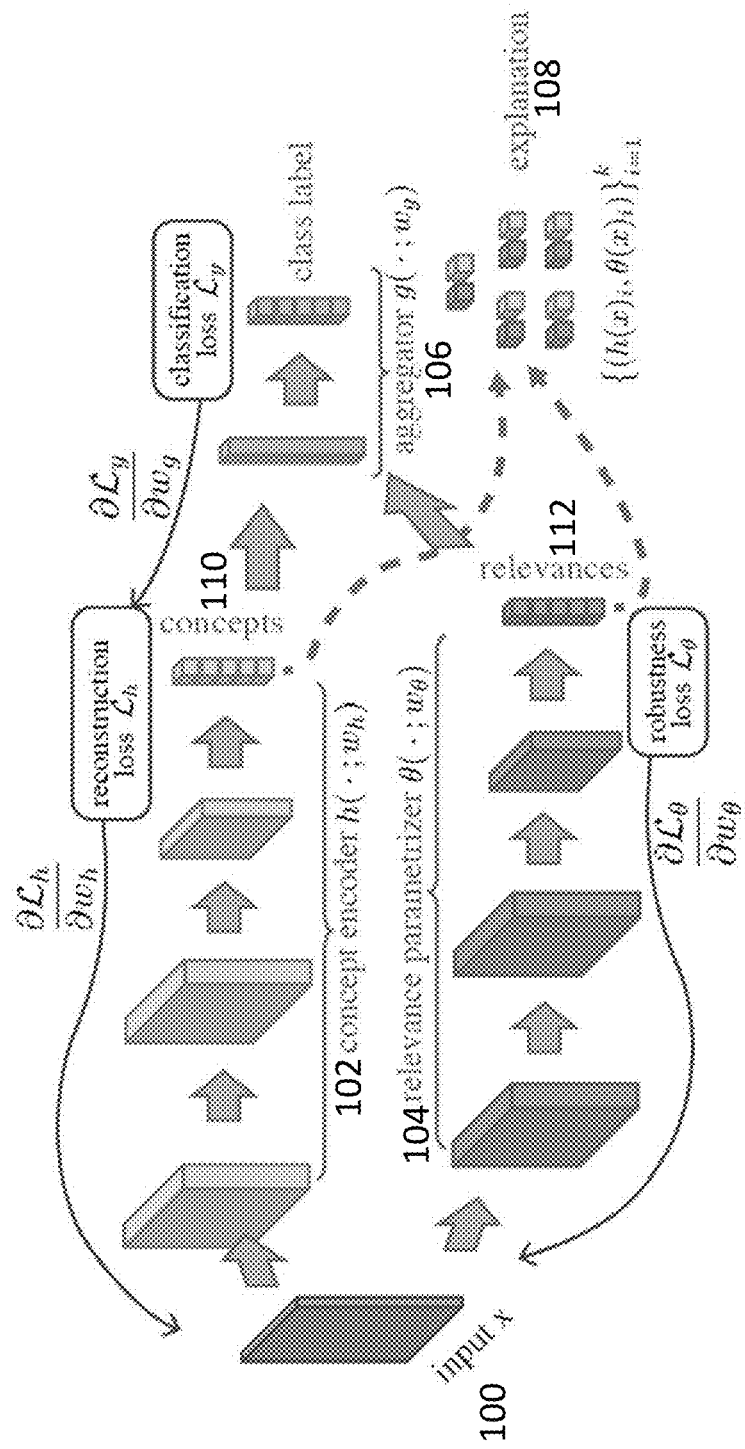
Figure 1 - SENN Architecture (Melis and Jaakola, 2018)

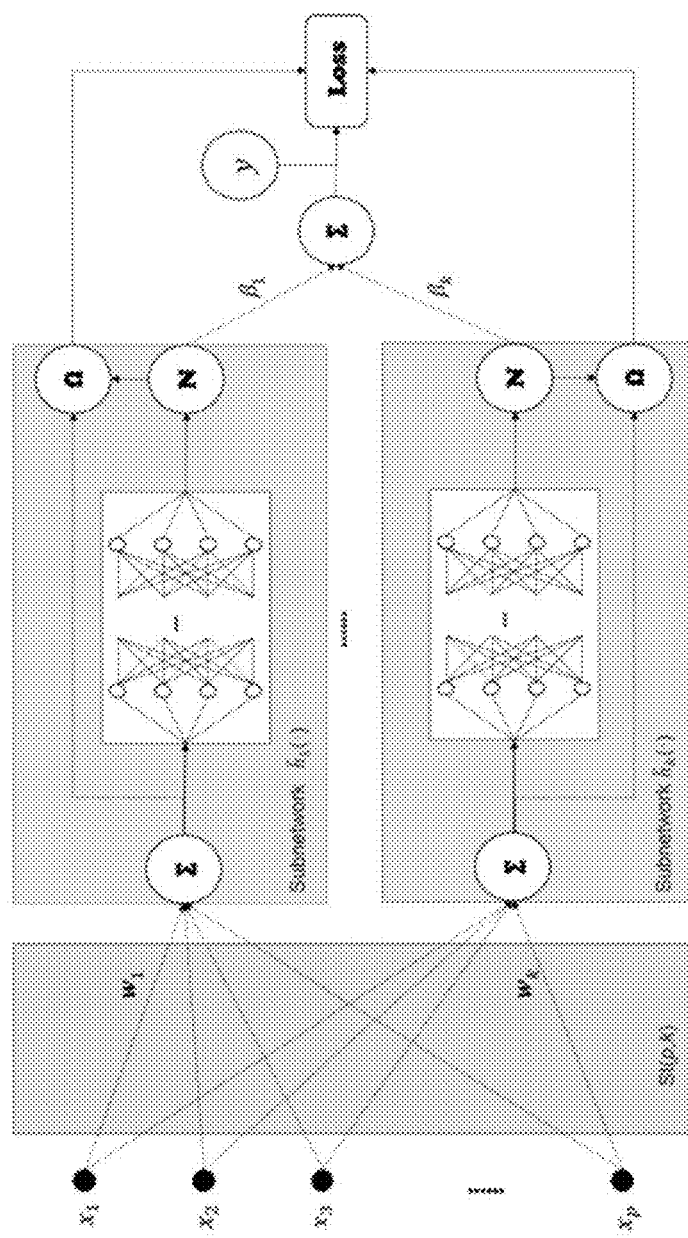
Figure 2 – Explainable Neural Network based on Additive Index Models (Vaughan et al., 2018)

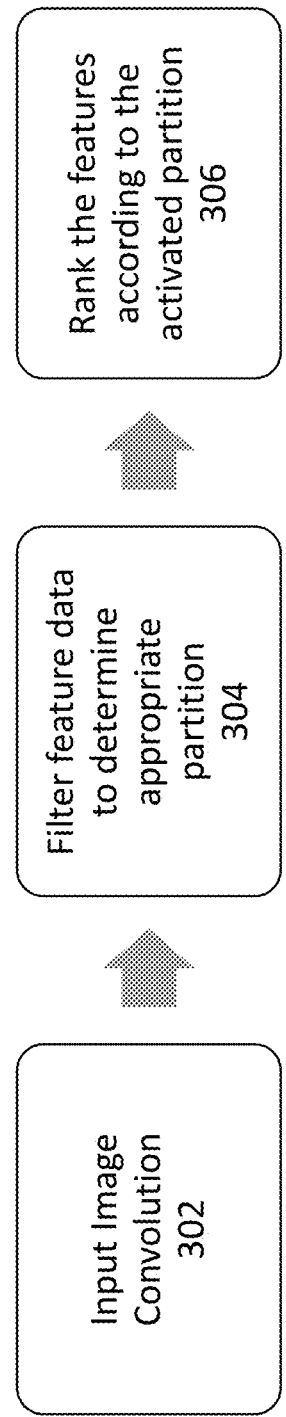
Figure 3 – Typical Partitioning Process

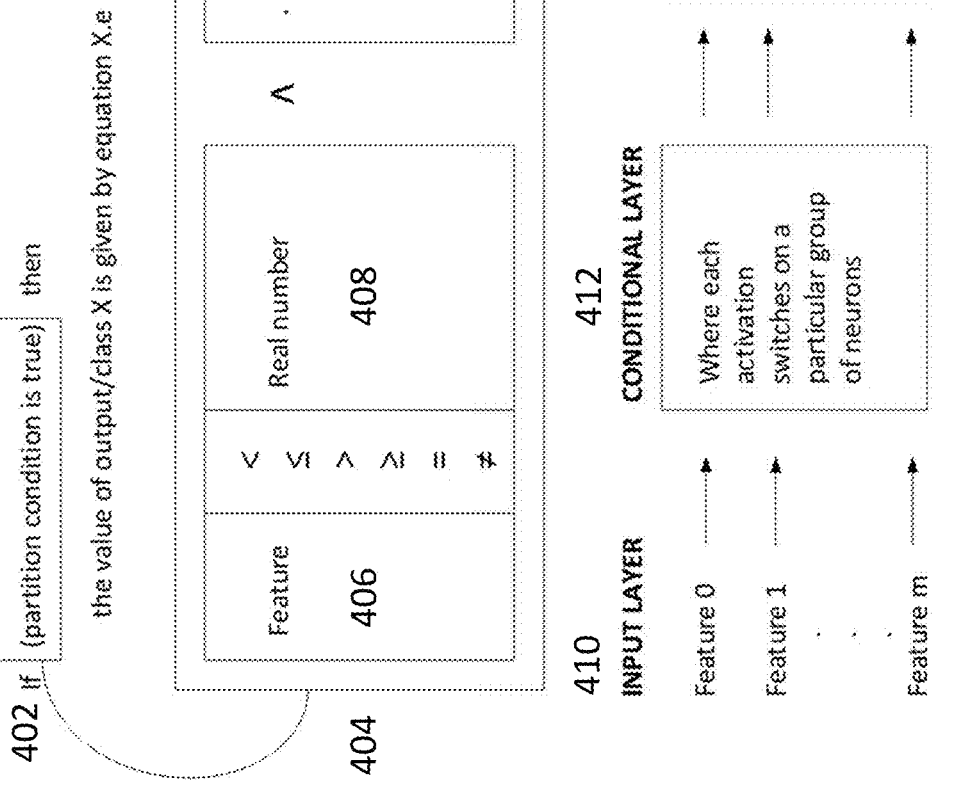
Figure 4 - Rule-based knowledge embedded in XNN

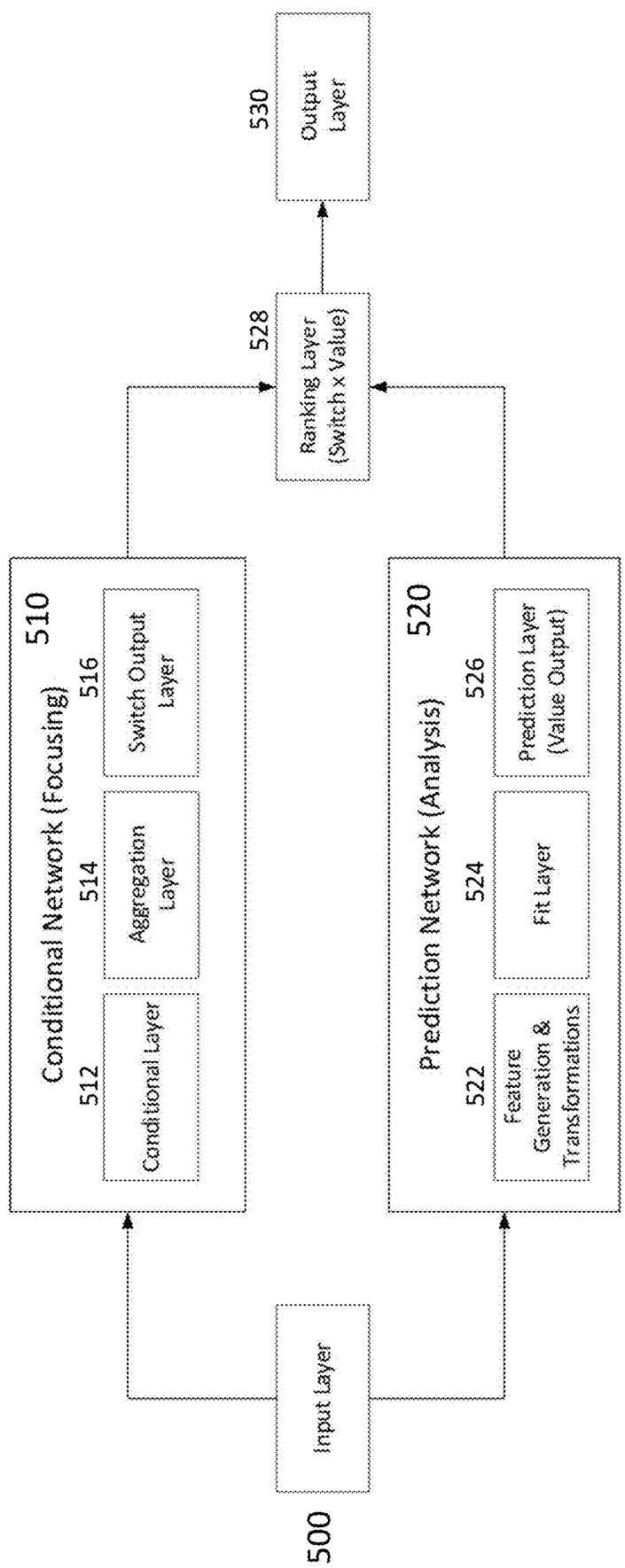
Figure 5 - High-Level XNN Architecture

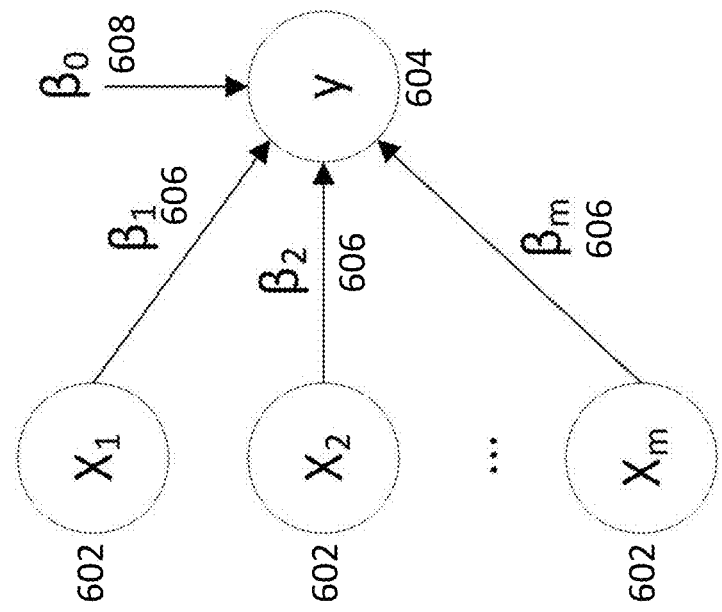
Figure 6 - Linear Regression with a Neural Network

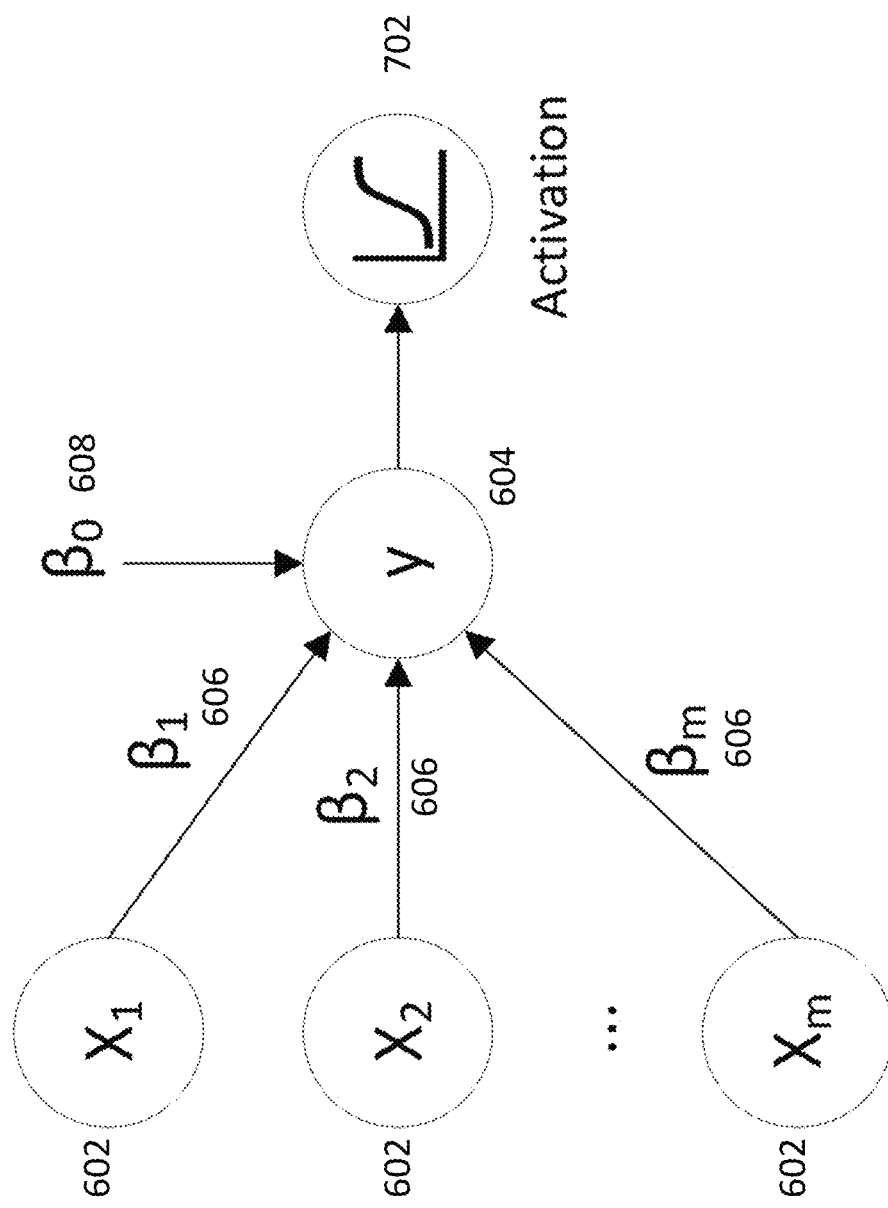
Figure 7 - Logistic Regression with a Neural Network

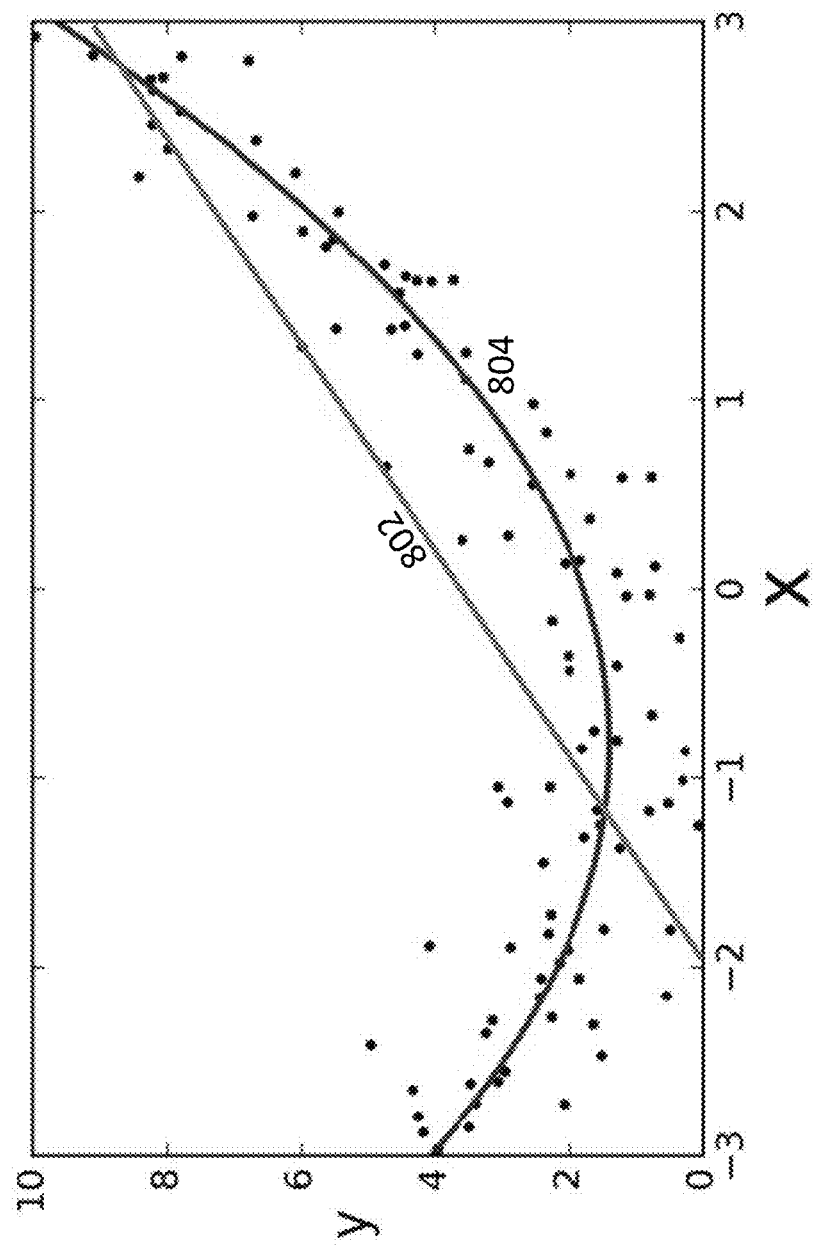
Figure 8 – Linear vs Polynomial Fit

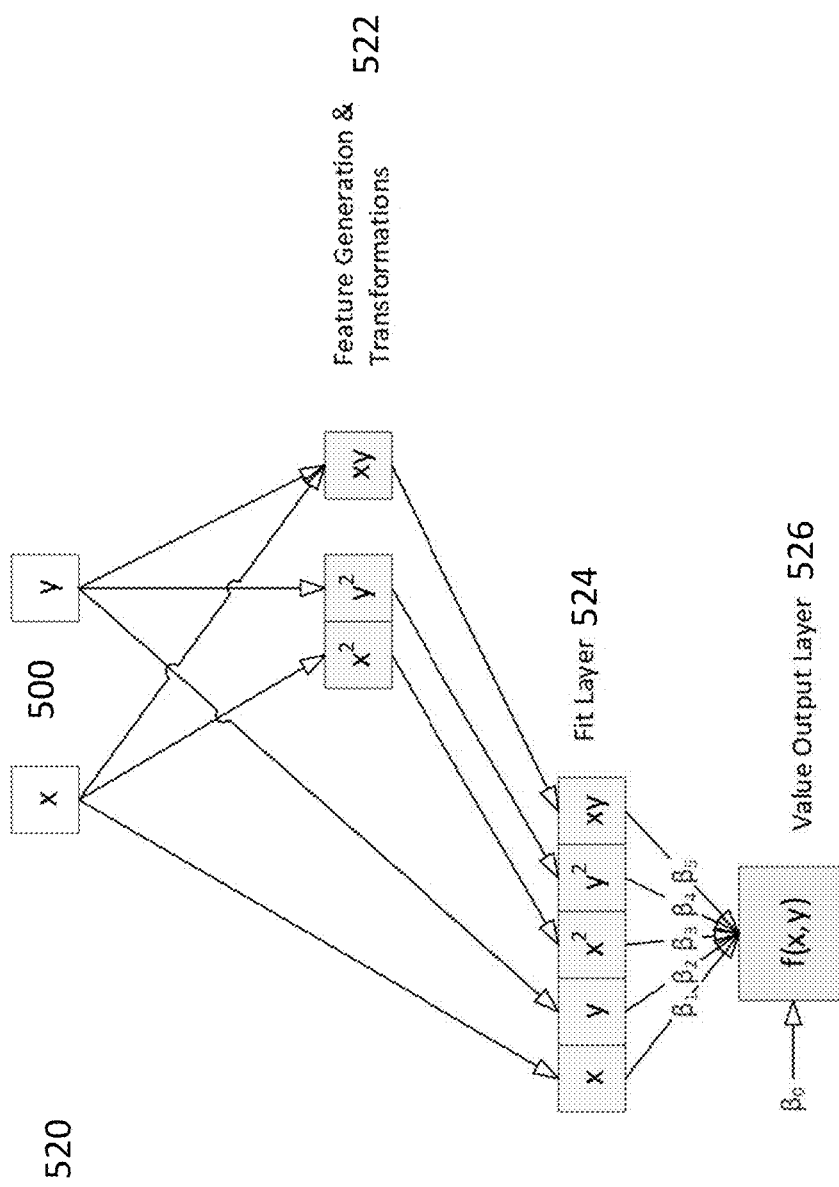
Figure 9 - XNN Linear Model – Prediction Network

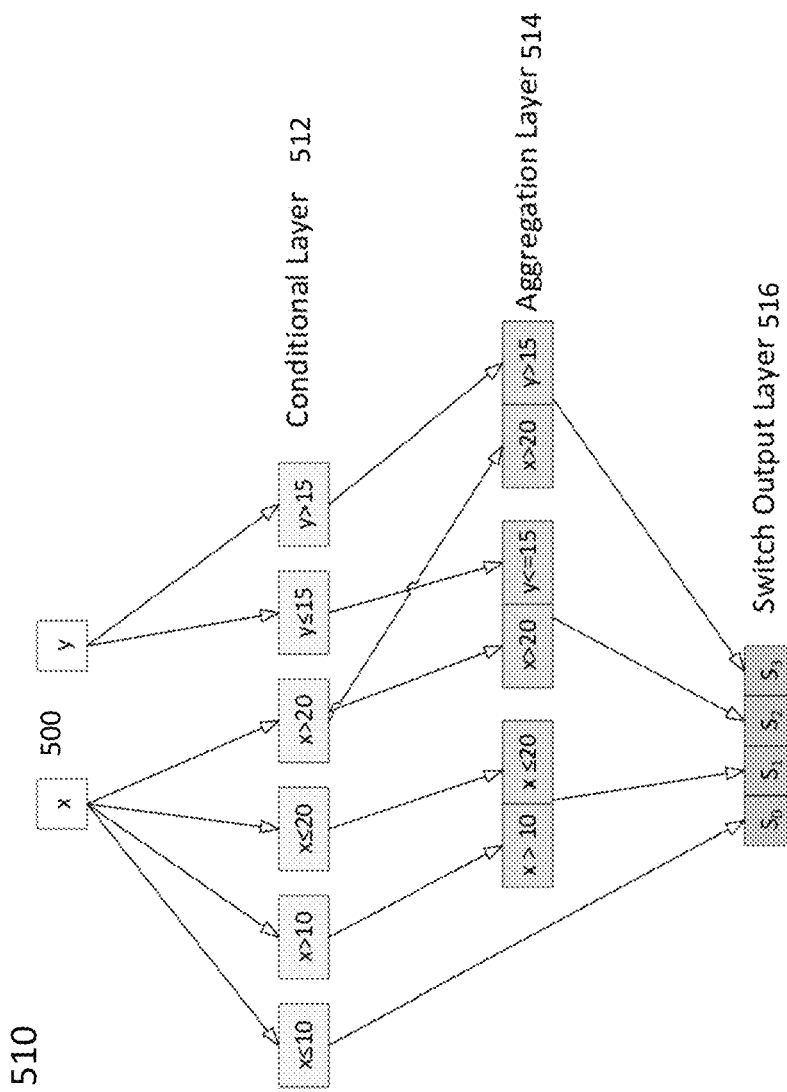
Figure 10 – Multiple partitions with an output switch – Conditional Network

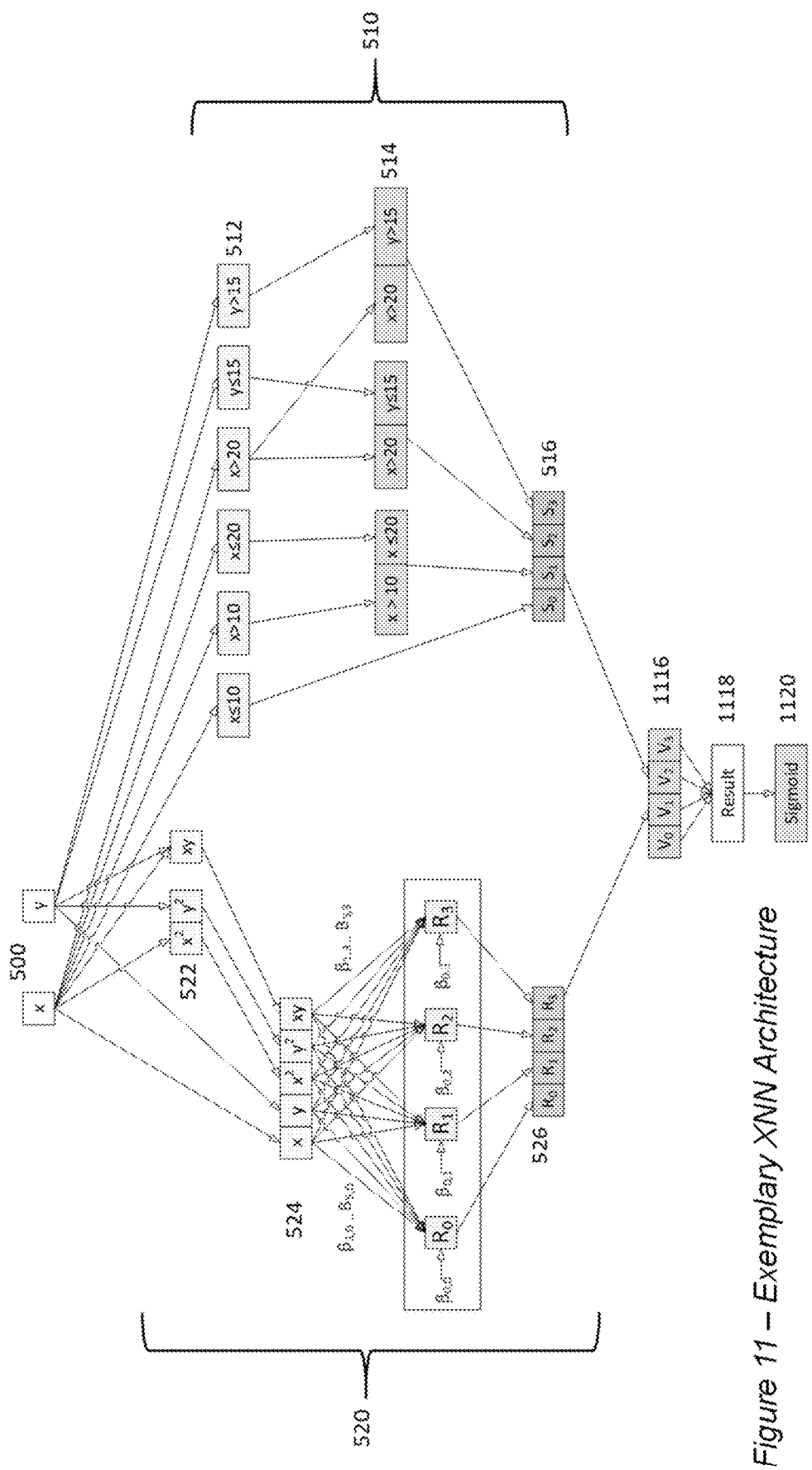
Figure 11 – Exemplary XNN Architecture

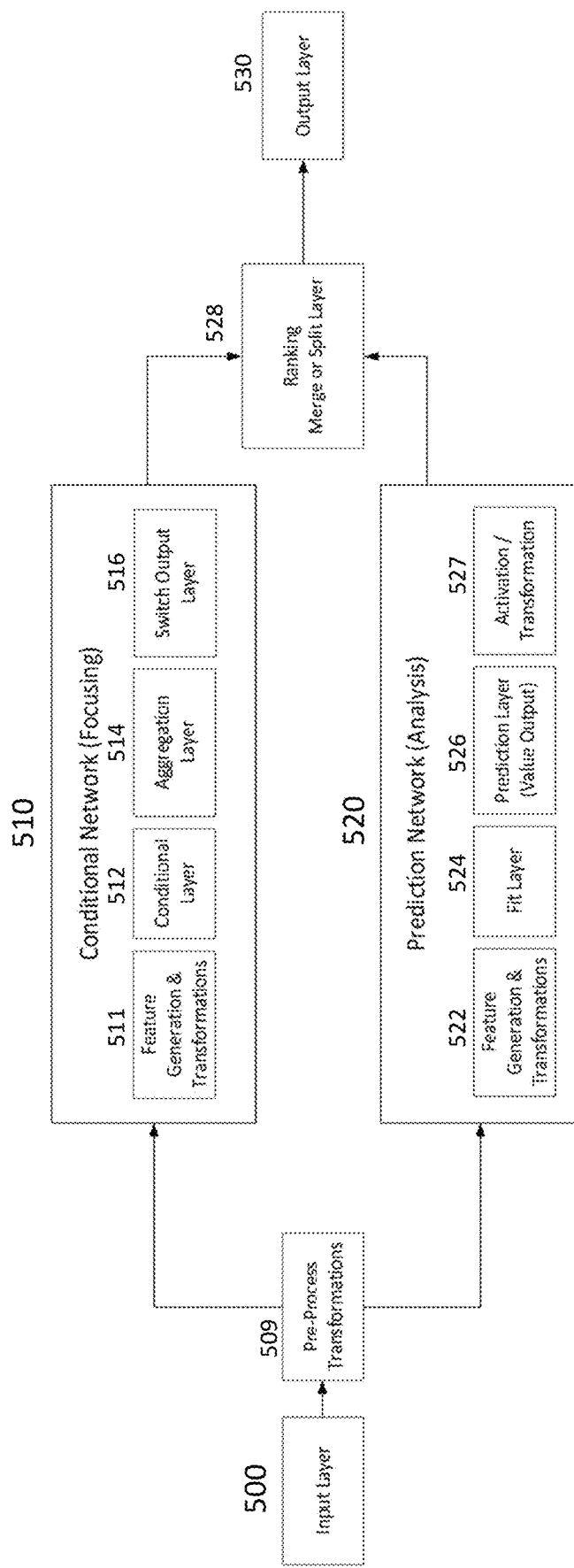
Figure 12 – Generalized High-Level XNN Architecture

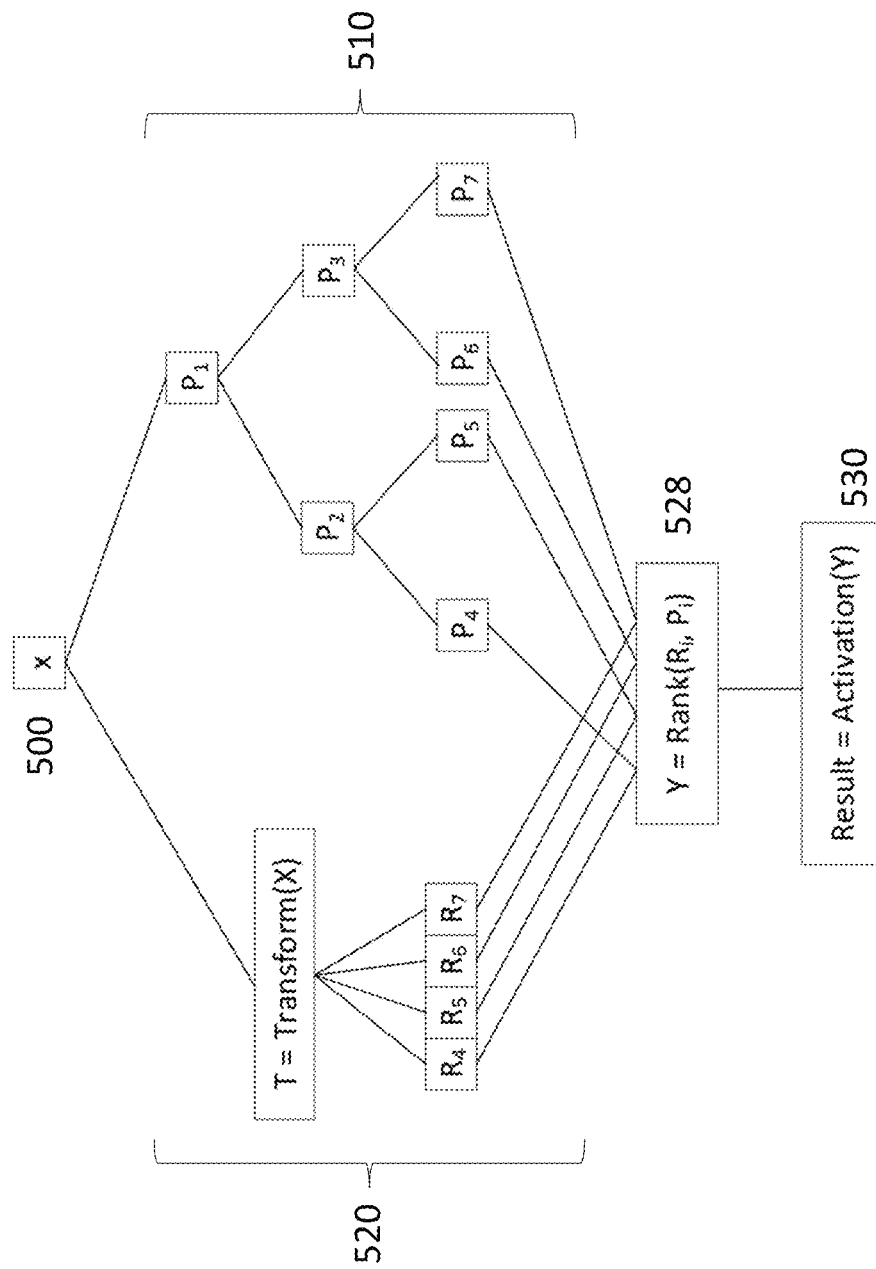
Figure 13 – Exemplary embodiment with partitions using the results of leaf nodes only

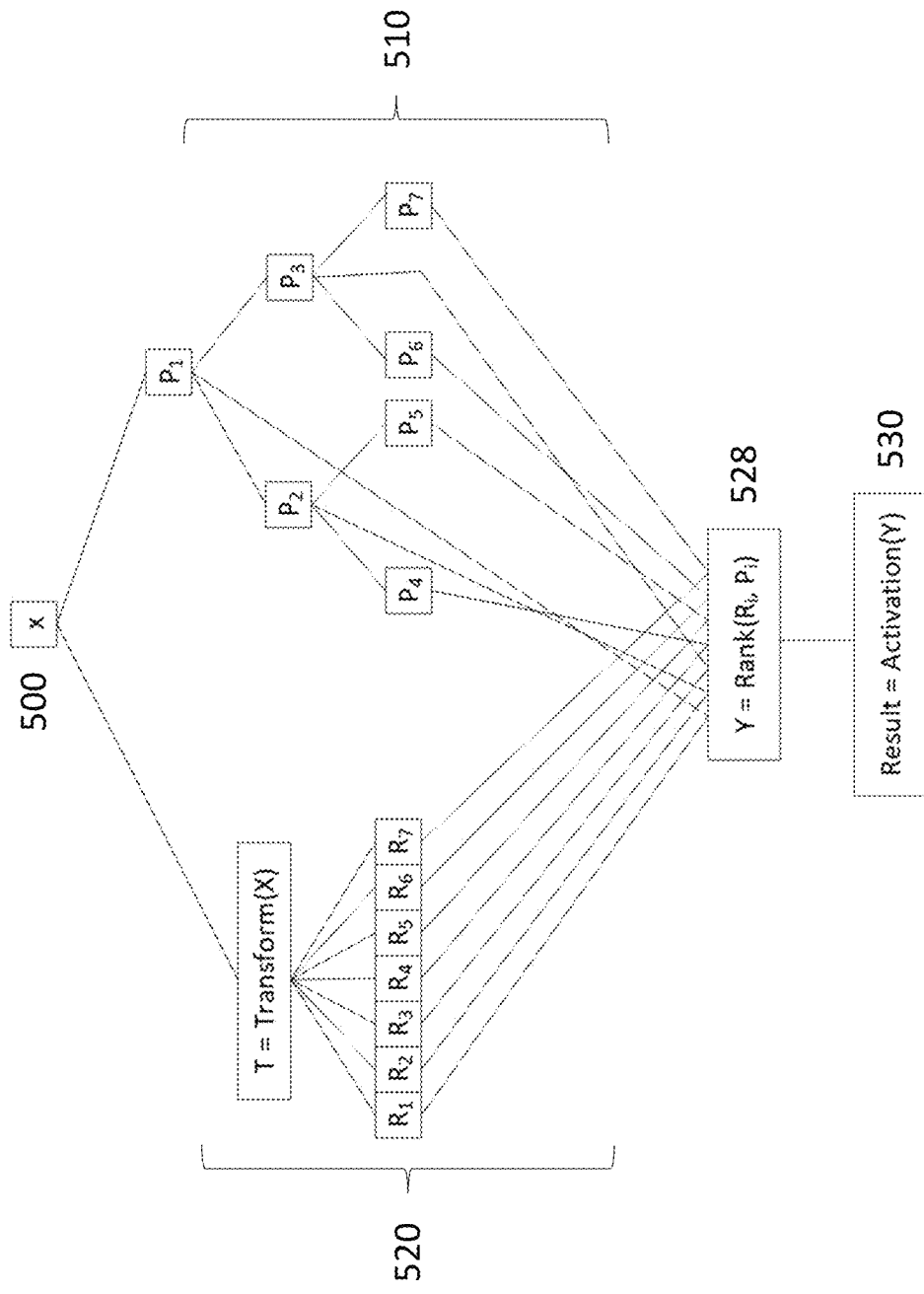
Figure 14 – Exemplary embodiment with partitions using all hierarchal nodes

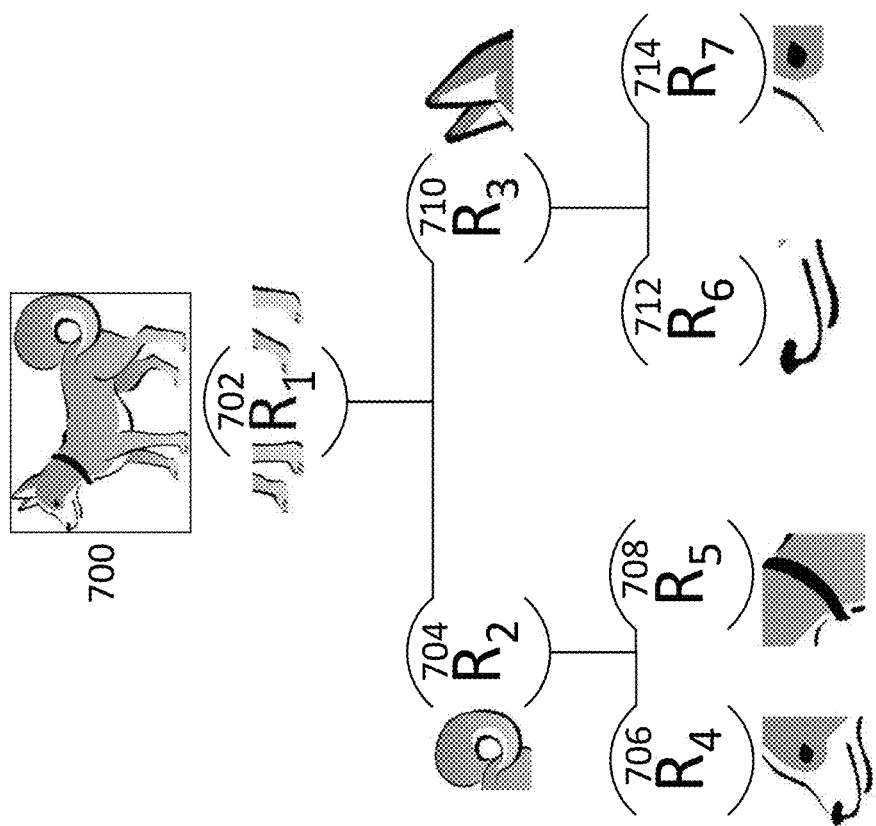
Figure 15 – Exemplary embodiment with abstract concepts within partitions

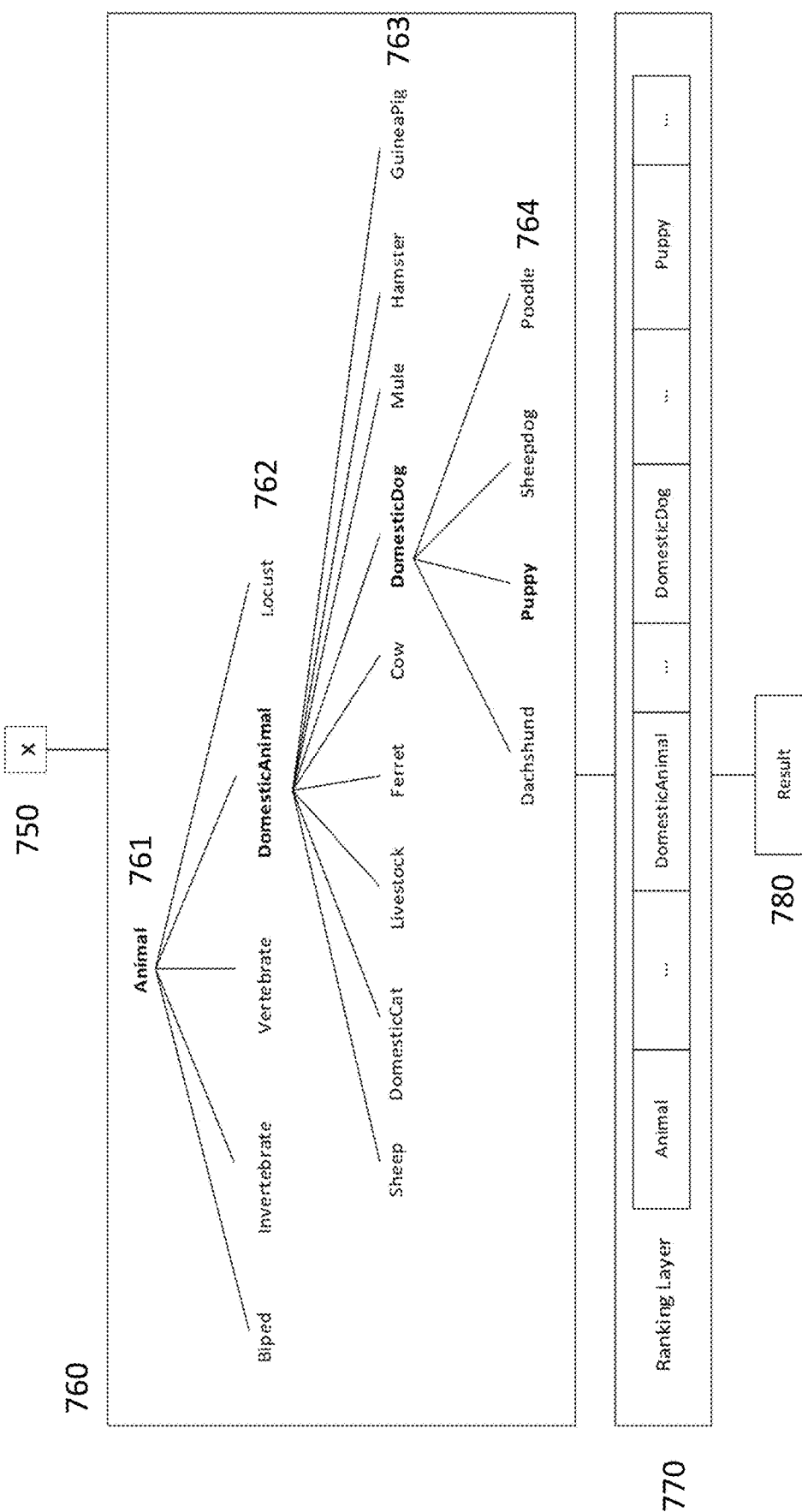
Figure 17 – Exemplary embodiment with concepts within partitions and taxonomy links

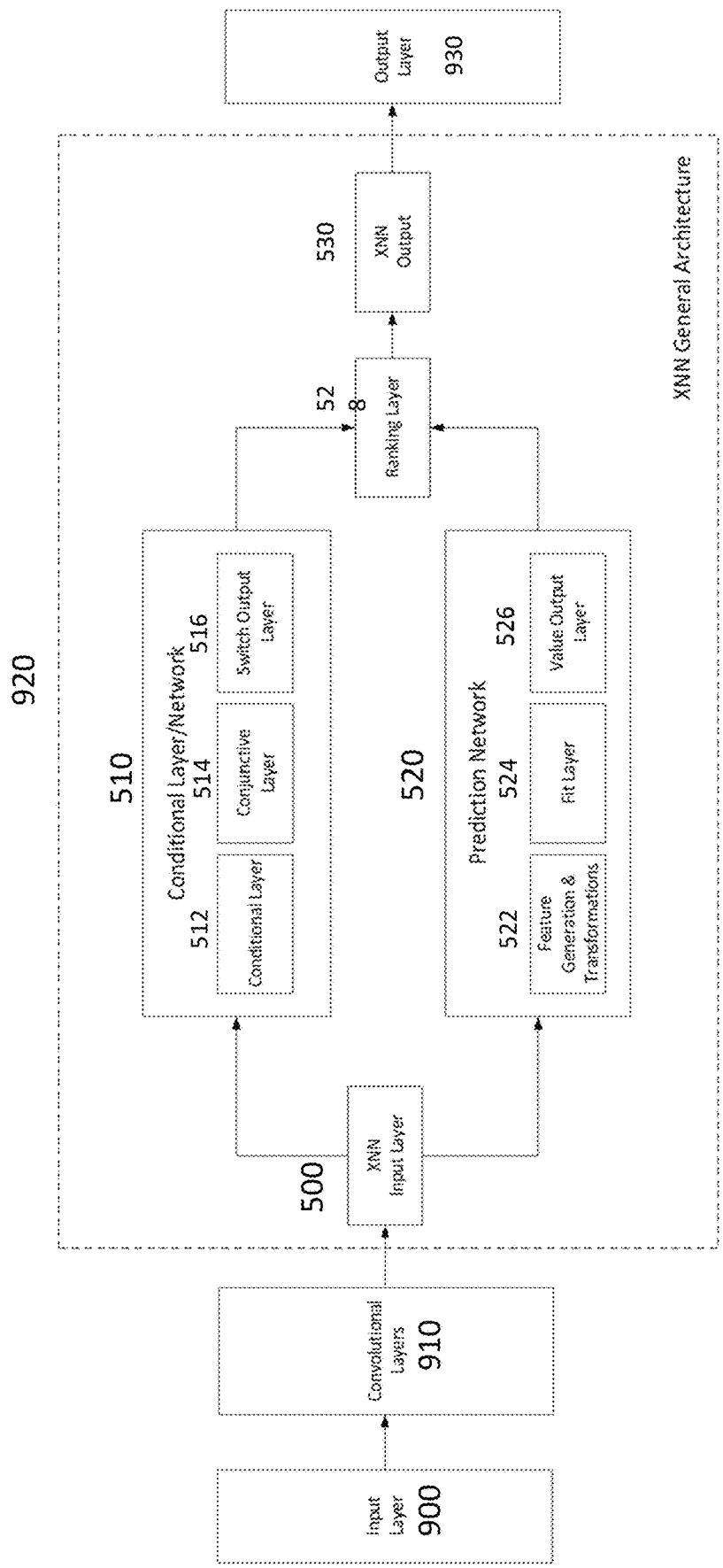
Figure 18 – Exemplary CNN XNN Architecture

ARCHITECTURE FOR AN EXPLAINABLE NEURAL NETWORK

CROSS-REFERENCE TO RELATED APPLICATIONS

The present patent application claims benefit and priority to U.S. Patent Application No. 62/936,716, filed on Nov. 18, 2019 and U.S. Patent Application No. 62/964,840, filed on Jan. 23, 2020, which are hereby incorporated by reference into the present disclosure.

FIELD

An explainable neural network may be shown and described.

BACKGROUND

Neural networks have proven to be great at complex tasks, especially where a complicated relationship between a set of inputs and outputs needs to be found automatically. A resurgence of useful AI algorithms that are outperforming humans has been fueled by the application of back-propagation-based methods such as Deep Learning. Despite their success, neural networks lack transparency due to their inherent black-box architecture, leading to lack of trust, hidden biases and over-dependency on training data.

A lot of research has been done on the creation of various neural network architectures to solve various problems with better model performance, but very limited research has been done on architectures which are interpretable and explainable, eliminating the need to apply post-hoc methods for interpretability. Lack of explainability can restrict the adoption of new AI applications in decision-critical applications such as autonomous driving and the medical industry.

The lack of understanding within neural networks has limited some of its potential uses. It may be difficult for an analyst or an engineer to explain the relationships between the input and corresponding output of a black-box neural network. Since a neural network could have multiple layers and neurons, it may be impossible to identify which functions occur through the neural network to produce the output.

Recent developments on methods relating to rule extraction from AI methods have attempted to explain the predictions of black-box models in a post-hoc manner. Self-Explaining Neural Networks (SENN) are methods of building explainability into the architecture of a neural network itself. Post-hoc methods often focus on posteriori explanations, where interpretations are derived locally with limited access to the inner workings of the model such as gradients or reverse propagation. Alternatively, they may implement oracle queries to estimate simpler models that capture the local input-output behavior.

Unless the model is already trained, SENN proposes a method which enables the architecture of a neural network to have built-in interpretability in a bottom-up approach. SENN enables point-wise local explanations which are achieved through a regularization scheme that ensures that the model not only looks like a linear model but also behaves like a linear model (locally). In such a scheme, data points which are close to each other should have similar coefficients.

A SENN consists of three components: a concept encoder that transforms the input into a small set of interpretable basis features, an input-dependent parametrizer that generates relevance scores, and an aggregation function that combines these scores to produce a prediction. The robustness loss on the parametrizer encourages the full model to behave locally as a linear function on $h(x)$ with parameters $\theta(x)$, yielding immediate interpretation of both concepts and relevancies.

SENN explanations differ from typical explanation methods. Concept based explanations may provide traditional input-based explanations. In a SENN, the description of each concept is provided with an explanation. For instance, in a prediction, certain concepts or features may be more important than others.

Another recent development proposed an architecture of an Explainable Neural Networking using Additive Index Models (AIM). This method applies architectural constraints to the neural network in such a way that the resulting network solves an AIM function. The method applies three important structural components (i) The projection layer (first hidden layer) using linear activation function. Each node on this layer feeds into one (ii) subnetwork, which learns a potentially nonlinear transformation of the input, and the (iii) combination layer calculates a weighted sum the output of the ridge functions.

SUMMARY

XNNs overcome the challenges in the present technologies by providing a precise and well-defined localization method that handles both local and global models. The global modelling capabilities of XNNs make them superior to these technologies as XNNs can better handle the widest variety of AI and Machine Learning models possible. XNNs also allow the contribution of specific data items to be identified precisely, while allowing the resulting activation paths within the network to also be understood fully. XNNs are superior as they are a true and complete white-box approach that enable logically equivalent transformations to be applied, reducing the computational costs involved especially during runtime. The computational cost optimization capabilities of XNNs are impossible to achieve with the current approaches.

Explainable Neural Networks (XNN) provide a global model that can zoom into an unlimited number of local partitions. Thus, they are simultaneously both global and local. A precise and identifiable function for each of an XNN's inherent components may exist. An XNN may be computationally efficient in feed-forward execution mode, computing the result and the explanation in the same step, while also being efficient for future training passes using gradient descent methods and any other similar future training method that may be invented.

XNNs are a new type of Artificial Neural Network (ANN) that are inherently interpretable and explainable. The main concept behind an XNN is that the inner network structure is fully interpretable without sacrificing model performance (i.e. accuracy and feed-forward execution speed). Interpretability is built within the architecture itself, yet it functions like a standard neural network. This eliminates the need to apply additional techniques or processing for interpreting the result of a neural network. XNNs can utilize existing software infrastructures and hardware used for ANNs and may also remain fully compatible with back-propagation training techniques. XNNs compute both the answer and its explanation in a single feed-forward step without any need for simulations, iterations, perturbation, etc. XNNs are also designed to be easily and efficiently implementable both in software and hardware, leading to substantial speed and storage improvements.

The architecture behind an XNN combines multiple local models into one global model. Local models analyze a small area within the entire search space. When a transaction is analyzed in a local manner, a linear model may be sufficient to explain the model. On the other hand, global models provide a holistic view. XNNs may merge the two—multiple partitions (or concepts) may represent the local zones and multiple linear models to explain each partition, while when combined they make up a global model. Additionally, XNNs go beyond linear data. They have been designed to cater to non-linear data by embedding transformations within the neural network itself, while still retaining explainability. Each layer, neuron and connection within an XNN has a precise, well known and understandable function, unlike standard ANNs which operate as a black-box, which the user interacts with based on their inputs and outputs alone and which therefore offer no explanations for their functions. XNNs are the first ever known fully white-box ANNs, giving rise to a new category of neural networks that are understandable and interpretable.

BRIEF DESCRIPTION OF THE FIGURES

Advantages of embodiments of the present invention will be apparent from the following detailed description of the exemplary embodiments thereof, which description should be considered in conjunction with the accompanying drawings in which like numerals indicate like elements, in which:

FIG. 1 is a representation of an embodiment of a Self-Explaining Neural Network.

FIG. 2 is a representation of an embodiment of an Explainable Neural Network using Additive Index Models.

FIG. 3 is an exemplary embodiment of a method flowchart illustrating the steps involved in creating partitions.

FIG. 4 is an exemplary embodiment of a flowchart illustrating the rule-based knowledge embedded in an XNN.

FIG. 5 is an exemplary embodiment of a high-level XNN architecture.

FIG. 6 is an exemplary diagram demonstrating a linear regression technique executable by a neural network.

FIG. 7 is an exemplary diagram demonstrating a logistic regression technique executable by a neural network.

FIG. 8 is an exemplary graph illustrating a linear fit and a polynomial fit on an exemplary data set.

FIG. 9 is an exemplary flowchart illustrating an exemplary embodiment of the structure of a linear XNN model.

FIG. 10 is an exemplary flowchart illustrating an exemplary embodiment of the structure of an XNN with multiple partitions and an output switch.

FIG. 11 is an exemplary flowchart illustrating an exemplary embodiment of an XNN architecture.

FIG. 12 is an exemplary Generalized High-Level XNN Architecture.

FIG. 13 is an exemplary embodiment with partitions using the results of leaf nodes only.

FIG. 14 is an exemplary embodiment with partitions using all hierarchical nodes.

FIG. 15 is an exemplary embodiment with abstract concepts within partitions.

FIG. 17 is an exemplary embodiment with concepts within partitions and taxonomy links.

FIG. 18 is an exemplary CNN XNN Architecture.

DETAILED DESCRIPTION

Figure 16B:
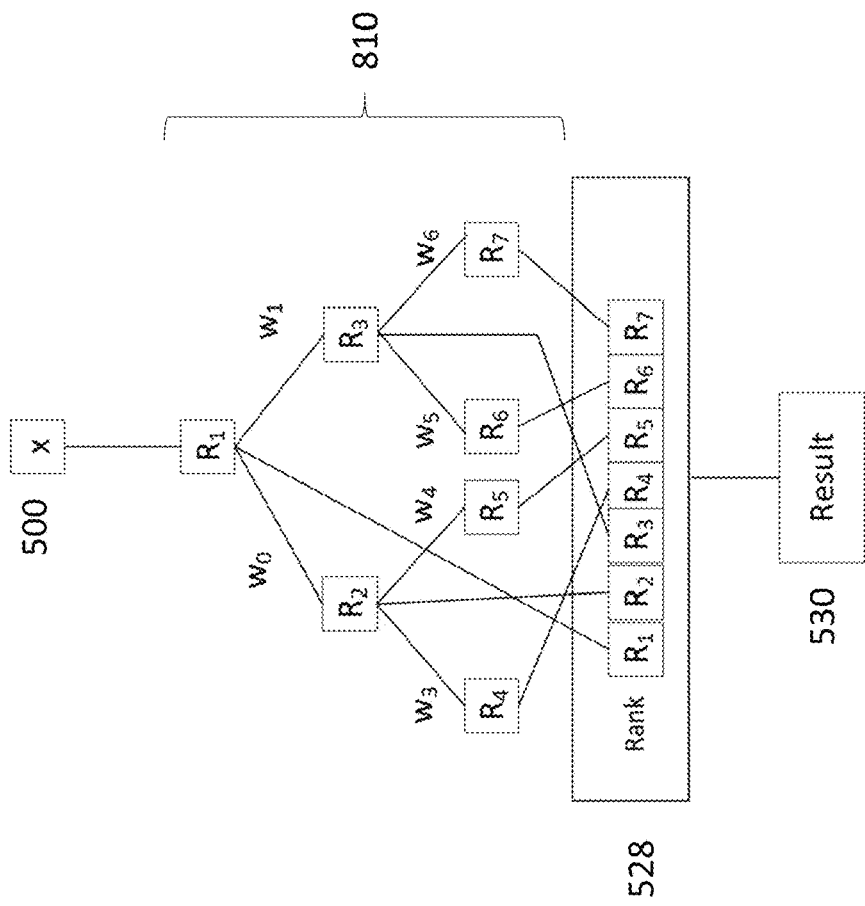
FIG. 16B is an exemplary embodiment of the conditional network and prediction network combined together—using the result of all nodes.

Aspects of the present invention are disclosed in the following description and related figures directed to specific embodiments of the invention. Those skilled in the art will recognize that alternate embodiments may be devised without departing from the spirit or the scope of the claims. Additionally, well-known elements of exemplary embodiments of the invention will not be described in detail or will be omitted so as not to obscure the relevant details of the invention.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage, or mode of operation.

Further, many of the embodiments described herein are described in terms of sequences of actions to be performed by, for example, elements of a computing device. It should be recognized by those skilled in the art that the various sequence of actions described herein can be performed by specific circuits (e.g., application specific integrated circuits (ASICs)) and/or by program instructions executed by at least one processor. Additionally, the sequence of actions described herein can be embodied entirely within any form of computer-readable storage medium such that execution of the sequence of actions enables the processor to perform the functionality described herein. Thus, the various aspects of the present invention may be embodied in a number of different forms, all of which have been contemplated to be within the scope of the claimed subject matter. In addition, for each of the embodiments described herein, the corresponding form of any such embodiments may be described herein as, for example, "a computer configured to" perform the described action.

Various exemplary embodiments and applications of explainable neural networks, or XNNs, may be provided. XNNs are a new type of ANN consisting of a combination of linear models (value network) combined with rules (conditional network). When multiple partitions are combined, they make up a globalized model. XNNs can be used both to predict values or for classification.

XNNs may provide valuable benefits over various existing techniques, such as the SENN (Self-Explaining Neural Network) architecture. Referring now to FIG. 1, FIG. 1 may illustrate a SENN architecture. The SENN in FIG. 1 includes an input 100, concept encoder 102, relevance parametrizer 104, aggregator 106, and finally, an explanation 108, provided as an output. The input 100 may go through both the concept encoder 102 and the relevance parametrizer 104, which may respectively be used to define concepts 110 and relevancies 112. In producing the concepts 110, the SENN may be burdened by a reconstruction loss $\mathcal{L}_h$ and a classification loss $\mathcal{L}_y$. The SENN may further be burdened with a robustness loss $\mathcal{L}_\theta$. SENN applies a mathematical process which encourages the full model to behave locally as a linear function. The following is the generalized function of a self-explaining prediction model:

$$f(x)=g(\theta_1(x)h_1(x), \ldots, \theta_k(x)h_k(x))$$

Where:
1. g is monotone and completely additively separable
2. For every $z_i:=\theta_i(x)h_i(x)$, g satisfies $$\frac{\delta g}{\delta z_i}$$

3. θ is locally difference bounded by h
4. $h_i(x)$ is an interpretable representation of x
5. k is small In the case of SENN, $f(x)$ is a function which is trained end-to-end with back-propagation, $h_i$ represents the features and $\theta_i$ represents the feature importance. For tabular datasets $h_i$ typically represents the features directly from the input dataset, whereas for images or high-dimensional data, $h_i$ may represent a concept from a convolutional process. The resulting output consists of an equation which gives the relevance scores for each concept.

Referring now to FIG. 2, FIG. 2 may illustrate an Explainable Neural network using Additive Index Models (AIM). AIM decomposes a complex function into a linear combination of multiple component functions. Given a dataset $x_i$, $y_{i_{i\in|n|}}$ with features $x\in \mathbb{R}^p$ and response y, the AIM takes the following equation: $g\ (\mathbb{E}\ (y|x))=\mu+h_1(w_1^T x)+ \ldots +h_k(w_k^T x)$. The architecture may consist of sub-networks which solve the AIM equation. The equation g may represent a link function, where μ is the intercept, $w_j \in \mathbb{R}^p$ are the projections indices of j=1, ... k, and $h_j(w_j^T x)$ are the corresponding nonparametric ridge functions. By fixing the ridge function to be a prespecified activation function, it reduces to a single-hidden-layer neural network. Subnetworks may be used to learn the ridge functions, $h_j(\bullet)$. The internal structure of subnetworks may be less critical, provided that the subnetworks have sufficient structure to learn a broad class of univariate functions. Subnetworks may consist of multiple fully-connected layers and use nonlinear activation functions. The combination layer may be the final hidden layer of the explainable network and may consist of a single node. The inputs of the node may be the univariate activations of all of the subnetworks. The weights learned may provide a final weighting of the ridge functions. A linear activation function may be used on this layer, so the output of the network as a whole may be a linear combination of the ridge functions.

The terms interpretable and explainable may have different meanings. Interpretability may be a characteristic that may need to be defined in terms of an interpreter. The interpreter may be an agent that interprets the system output or artifacts using a combination of (i) its own knowledge and beliefs; (ii) goal-action plans; (iii) context; and (iv) the world environment. An exemplary interpreter may be a knowledgeable human.

An alternative to a knowledgeable human interpreter may be a suitable automated system, such as an expert system in a narrow domain, which may be able to interpret outputs or artifacts for a limited range of applications. For example, a medical expert system, or some logical equivalent such as an end-to-end machine learning system, may be able to output a valid interpretation of medical results in a specific set of medical application domains.

It may be contemplated that non-human Interpreters may be created in the future that can partially or fully replace the role of a human Interpreter, and/or expand the interpretation capabilities to a wider range of application domains.

There may be two distinct types of interpretability: (i) model interpretability, which measures how interpretable any form of automated or mechanistic model is, together with its sub-components, structure and behavior; and (ii) output interpretability which measures how interpretable the output from any form of automated or mechanistic model is.

Interpretability thus might not be a simple binary characteristic but can be evaluated on a sliding scale ranging from fully interpretable to un-interpretable. Model interpretability may be the interpretability of the underlying embodiment, implementation, and/or process producing the output, while output interpretability may be the interpretability of the output itself or whatever artifact is being examined.

A machine learning system or suitable alternative embodiment may include a number of model components. Model components may be model interpretable if their internal behavior and functioning can be fully understood and correctly predicted, for a subset of possible inputs, by the interpreter. In an embodiment, the behavior and functioning of a model component can be implemented and represented in various ways, such as a state-transition chart, a process flowchart or process description, a Behavioral Model, or some other suitable method. Model components may be output interpretable if their output can be understood and correctly interpreted, for a subset of possible inputs, by the interpreter.

An exemplary machine learning system or suitable alternative embodiment, may be (i) globally interpretable if it is fully model interpretable (i.e. all of its components are model interpretable), or (ii) modular interpretable if it is partially model interpretable (i.e. only some of its components are model interpretable). Furthermore, a machine learning system or suitable alternative embodiment, may be locally interpretable if all its output is output interpretable.

A grey-box, which is a hybrid mix of a black-box with white-box characteristics, may have characteristics of a white-box when it comes to the output, but that of a black-box when it comes to its internal behavior or functioning.

A white-box may be a fully model interpretable and output interpretable system which can achieve both local and global explainability. Thus, a fully white-box system may be completely explainable and fully interpretable in terms of both internal function and output.

A black-box may be output interpretable but not model interpretable, and may achieve limited local explainability, making it the least explainable with little to no explainability capabilities and minimal understanding in terms of internal function. A deep learning neural network may be an output interpretable yet model un-interpretable system.

A grey-box may be a partially model interpretable and output interpretable system, and may be partially explainable in terms of internal function and interpretable in terms of output. Thus, an exemplary grey-box may be between a white-box and a black-box on a scale of most explainable and interpretable (white-box) to least explainable and interpretable (black-box). Grey-box systems may have a level of modular interpretability since some of their components may be model interpretable.

It is understood that some neural network architectures output interpretable results, but these results are not fully model interpretable. Hence, these neural network architectures are considered black-box, or grey-box if some inner components are considered model interpretable. XNNs offer advantages over these neural network architectures, for example, by providing an output interpretable and fully model interpretable system (white-box). Unlike XNNs, none of these neural network architectures uses partitions to structure the model into well-defined and interpretable local models. Additionally, since they are only output interpretable, it may not be possible to encode the network into machine and human readable rules. Therefore, they may only provide local explanations, and may not be capable of providing global interpretability directly from the model structure. Other types of neural network architectures may have similar drawbacks. Since none have the concept of partitioning, the functions that model the different components may require a complex non-linear transformation, which may turn out to be entirely a black-box component, thus the model may only be output interpretable and not model interpretable. For full model interpretability understanding of the model, the transformations within the different components should also be interpretable. XNNs may adopt a wide-network approach through the different partitions, thus enabling transformations to be simpler and easier to understand, rather than complex and impossibly opaque as with deep networks. It may further be contemplated that XNNs may also support inner components which make use of a deep network structure, thus in combination, superior over any existing neural network architectures.

While present technologies may use some form of a linear equation to model an explainable function using a neural network, XNNs differ in several aspects: First, XNNs use the notion of hierarchical features (or hierarchical concepts) through the notion of partitions and rules. In XNNs, the function $f(x)$ can be seen as a local function, which models the feature importance within a specific partition. The combination of all the functions creates a global interpretable model. Further, XNNs may utilize an external process to identify suitable partitions during their initialization, yet also support further training using back-propagation and related technique. Current technology relies solely on using back-propagation to learn a function which may limit the level of explainability.

Since XNNs may be encoded into rules and may make use of an external process to initialize the structure of the XNN partitions, it is possible to embed human-knowledge within the neural network. Thus, XNNs can mix human knowledge and machine-generated knowledge. Through the use of gradient descent methods such as back-propagation, knowledge in the form of rules could be refined to create a global model which can also function in a local manner. The current technology is not capable of functioning as such, as a typical neural network is simply used to fit a single large function.

The weights and structure of an XNN can be encoded in a sequence of IF-THEN rules or disjunctive normal form (DNF) rules or Conjunctive normal form (CNF) rules. Presently, the resulting model consists of a single equation which incorporates all the features (or concepts).

XNNs support rotational and scale invariance together with non-linear functions, and also summarization over multiple partitions in multiple dimensions. The current technology uses a combination of linear functions and cannot represent non-linear data in the same manner that XNNs with a high-level of interpretability can.

XNNs provide a higher level of flexibility by enabling partitions to be customized according to the level of simplicity or complexity which is required. Presently, if the resulting model is interpretable, but still too complex to understand, there it is not possible to create new partitions in order to simplify the local interpretability, while still maintaining the global interpretability of XNNs.

An XNN, being a true white-box system, does not suffer from any reconstruction losses or any classification losses. A reconstruction step may not be needed by the XNN and a precise classification may be created as part of the explanation by the XNN in a lossless manner. All information needed to come up with the classification is preserved by the XNN, and additionally all the activation paths and methods used are also easily identifiable without any additional computational cost.

In an exemplary embodiment, XNNs may be used to recognize hand-written digits. The first step in the process of creating such an XNN would be to identify the partitions using a suitable clustering or hierarchical partitioning method, such as the induction method or a logical equivalent. The clustering or hierarchical portioning method may utilize a variety of appropriate methods including, but not limited to, agglomerative clustering, divisive clustering, relocation partitioning, probabilistic clustering, k-medoid methods, k-means methods, fuzzy clustering, density based clustering, grid based methods, gradient descent based methods, evolutionary methods, region splitting, region growing, sub-space clustering, projection methods, co-clustering methods and lazy clustering methods. The input to the partitioning method can be either the input features directly for low-dimensional data (i.e. tabular) or data which has been pre-processed (for example, from a convolutional network). Features which have been transformed using a convolutional process may typically represent a higher-level of abstraction such as an edge, a stroke or a pattern. Although image data could in theory be modelled as a flat list of pixels, a convolutional process is typically applied in order to reduce the dimensionality of the data while retaining the most important features. This makes neural networks more efficient to process and they typically converge to a better result. In an exemplary XNN configured to recognize hand-written digits, convoluted features may include patterns of various numbers at different level of abstraction.

Through appropriate partitioning, similar features (or concepts) are then grouped together. For example, various patterns of the number 2 may be grouped together in one partition. Another partition may be created to represent the number 1 and number 7 together, since they may contain similar features or concepts. Then, a more fine-grained partitioning may immediately separate the two numbers.

Referring now to the exemplary method flowchart in FIG. 3, given a specific input sample (e.g. image of number 7), the following steps occur during the partitioning: In an optional first step, the input image may be convoluted 302 to higher-level abstracted features. The feature data (or transformed feature data) may then be filtered 304 to determine which partition to activate. In this exemplary case the partition which distinguishes between 1 and 7 may be selected. The prediction network finally ranks all the features of the convolutional network within the activated partition only 306.

The prediction network may determine that the convolutional filter which detects horizontal lines is the most important, which is why it has been used to classify the resulting output as number 7. If scale or rotational variances exist in the examples, the prediction network may automatically correct for this using non-linear methods.

In this exemplary application, an XNN variant, such as a convolutional XNN (CNN-XNN), may be the most appropriate, due to the presence of convolution layers. CNN-XNNs allow for explanation summaries to take into consideration the composition of the convolution filters and kernels used during each activation, thus allowing, for example, an object that has been identified using a diagonal edge kernel to be labelled as a "diagonal edge". Therefore CNN-XNNs differ from XNNs which may provide a global model but can also behave like a local model through the partitioning mechanism. The concepts or features in an XNN may be related to the activated partition(s) only. XNNs may model a hierarchy of linear models together with support for non-linearities and rotational and scale invariances.

XNNs can also be extended and enriched with the addition of items such as taxonomical information, links to internal and external taxonomies, bias detectors, and also seamlessly integrated with knowledge bases and rule systems, all of which is impossible to do with existing approaches that are all black-box methods. XNNs can also form part of a causal logic induction system that can extract higher level concepts and link them to a causal model, which is something that is completely impossible to do with a standard black-box neural network. XNNs can link causal effects not just at the output layer but also within their internal layers, giving unique capabilities to the XNN architecture that allow AI systems using XNNs to achieve knowledge, understanding, and advanced reasoning capabilities outside the reach of deep learning based systems and machine learning techniques that do not fully support the entire range of first-order logic rules and assertions.

The XNN may embed rule-based knowledge in multiple formats. A universal knowledge representation or compatible format may be implemented allowing for rules and related information to be easily encoded and transmitted over computer networks and also enable XNNs to work in offline modes and be easily implemented in hardware apart from software. The representation format may be made up of a set of rules and assertions that have a localization trigger together with simultaneous processing for the answer and explanation production, which are then applied to domain specific applications, for example by transmitting and encoding the rules, knowledge and data for use in a medical diagnosis imaging scanner system so that it can produce a diagnosis, processed image and an explanation which can then be further used by other AI systems in an automated pipeline, while retaining human readability and interpretability. The representation format may consist of a system of Disjunctive Normal Form (DNF) rules or other logical alternatives, like Conjunctive Normal Form (CNF) rules, first-order logic assertions, and so on. The representation format can also be implemented directly as a hardware circuit, which may be implemented either using (i.) flexible architectures like FPGAs, or (ii.) more static architectures like ASICs or analogue/digital electronics, or (iii.) neuromorphic architectures that are suited for the hardware implementation of connectionist models such as XNNs, or (iv.) quantum computing hardware. The representation transmission can be affected entirely in hardware when using flexible architectures that can configure themselves dynamically. Quantization and other compression techniques may be applied on the XNN for faster and more efficient execution. The localized trigger is defined by a localization method, which determines which partition to activate. A partition is a region in the data, which may be disjoint or overlapping. The answer of a rule is a linear or non-linear equation which consists of coefficients with their respective dimension, representing both the answer to the problem and the explanation coefficients which may be used to generate domain specific explanations. The XNN rules may also represent a hierarchy of rules (nested conditional rules or a series of nested if-then-else rules), that may represent any form of selection logic. For simplicity, examples are illustrated using a single hierarchical layer. However, the XNN can have multiple deep layers of nested rules in its architecture. The nested rules may be converted into a logically equivalent single layer, for example one consisting of rules in disjunctive normal form (DNF) or some other equivalent. Some exceptions to this involve recurrent networks, where some hierarchical layers may need to be retained according to the recurrence formulas extracted as part of the explanation.

Referring now to exemplary FIG. 4, FIG. 4 may be a schematic flowchart illustrating rule-based knowledge or logically equivalent knowledge embedded in XNN. First, a partition condition 402 may be chosen using a localization method that may reference a number of rules and encoded knowledge. Partitions can be non-overlapping or overlapping. In the case of non-overlapping partitions, the XNN may take a single path in feed forward mode. In the case of overlapping partitions, the XNN may take multiple paths in feed forward mode and may compute a probability or ranking score for each path. In an alternative embodiment, overlapping partitions may also make use of an aggregation function which combines the results from the activated partitions. The partition condition 402 can be interpreted as focusing the XNN onto a specific area of the model that is represented. The partition localization method may be typically implemented in the form given by template 404 where various features 406 are compared to real numbers 408 repetitively using conjunctive normal form (CNF) or a logical equivalent such as disjunctive normal form (DNF). In an alternative embodiment, other non-Boolean logical systems may be utilized such as Type 1 or Type 2 fuzzy logic systems, modal logic, quantum logic, probabilistic logic or other suitable type of logical system for the expression of logical or similar statements.

The localization method values, conditions and underlying equations may be selected and identified using an external process, such as an XAI model induction method or a logically equivalent method. In an alternative embodiment, the localization values, conditions and underlying equations may be partially or fully induced using an end-to-end approach using gradient descent methods such as back-propagation. The chosen values are iteratively tested and varied until a certain level of accuracy is obtained in fitting the model to the relative test or synthetic data provided and/or by iteratively querying the initial black-box predictor model. An XNN may have four main components in its localization or focusing module, which may be part of the conditional network 510, namely the input layer 410, a conditional layer 412, a value layer 414 and an output layer 416.

The input layer 410 is structured to receive the various features that need to be processed by the XNN. The input layer 410 feeds the processed features through a conditional layer 412, where each activation switches on a group of neurons. The conditional layer may require a condition to be met before passing along an output. Further, the input may be additionally analyzed by a value layer 414. The value of the output X (in case of a calculation of an integer or real value, etc.) or the class (in case of a classification application, etc.) X is given by an equation X.e that is calculated by the value layer 414. The X.e function results may be used to produce the output 416. It may be contemplated that the conditional layer and the value layer may occur in any order, or simultaneously.

Referring now to exemplary FIG. 5, FIG. 5 may illustrate a schematic diagram of an exemplary high-level XNN architecture. An input layer 500 may be inputted, possibly simultaneously, into both a conditional network 510 and a prediction network 520. The conditional network 510 may include a conditional layer 512, an aggregation layer 514, and a switch output layer (which selectively outputs the conditional values) 516. The switch output layer may aggregate and selectively output the desired result. The prediction network 520 may include a feature generation and transformation 522, a fit layer 524, and a prediction output layer (value output) 526. The layers may be analyzed by the selection and ranking layer 528 that may multiply the switch output by the value output, producing a ranked or aggregated output 530. The explanations and answers may be concurrently calculated by the XNN by the conditional network and the prediction network. The selection and ranking layer 528 may ensure that the answers and explanations are correctly matched, ranked, aggregated, and scored appropriately before being sent to the output 530.

The processing of the conditional network 510 and the prediction network 520 is contemplated to be in any order. Depending on the specific application of the XNN, it may be contemplated that some of the components of the conditional network 510 like components 512, 514 and 516 may be optional or replaced with a trivial implementation. Depending on the specific application of the XNN, it may further be contemplated that some of the components of the prediction network 520 such as components 522, 524 and 526 may be optional and may also be further merged, split or replaced with a trivial implementation.

Referring now to FIG. 12, FIG. 12 shows another exemplary embodiment where an additional feature generation and transformation component 509 may also be applied after the input layer and prior to the conditional/prediction networks. It may be further contemplated that an additional transformation step 511 may also be applicable within the conditional network. An additional transformation step 527 may optionally be applicable after the prediction 526. Step 527 may be required to apply a suitable activation function and/or suitable transformation on the predicted output. Typical activation functions may include the sigmoid or softmax functions or suitable equivalent. Typical transformations may involve transformation of the prediction output using some form of structure such as (i) hierarchical tree or network, (ii) causal diagrams, (iii) directed and undirected graphs, (iv) multimedia structures, (v) sets of hyperlinked graphs, or suitable structures.

In an alternative embodiment, the ranking layer 528, may also select, merge or split data from multiple partitions as shown in FIG. 12. The ranking layer combines the switch output with the prediction network output. In an exemplary trivial implementation the ranking function may simply choose the value for the activated partition. It is contemplated that in a typical embodiment, any suitable transformation, selection, merge or split function may be applied within the ranking function.

It may further be contemplated that in some circumstances, the selection and ranking layer 528 and the output 530 may be combined together into one integrated component. For optimization purposes, the XNN may also be implemented with both the conditional network 510 and the prediction network 520 together with all their components merged together into one network. This merged conditional and prediction network may also be merged together with a combined selection and ranking layer 528 and the output 530. This optimization will still result in a logically equivalent XNN, which may be faster for feed forward processing.

Figure 16A:
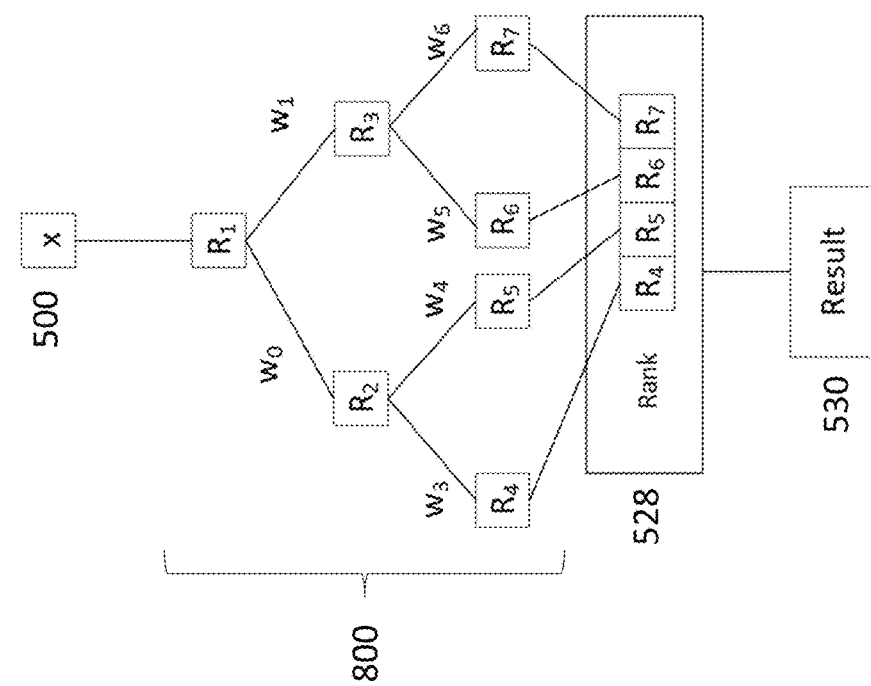
FIG. 16A is an exemplary embodiment of a combined conditional network and prediction network—using the result of the leaf nodes only.

FIG. 16A and FIG. 16B show exemplary embodiments of how the conditional network 510 may be combined with the prediction network 520 as one XNN network. In such an exemplary embodiment, the partitioning system models the hierarchical concepts of the underlying dataset. It may be contemplated that a hierarchy of concepts may be linked to a suitable taxonomy and/or ontology, such as YAGO-SUMO, WordNet and other suitable taxonomies and ontologies. It may be contemplated that the use of such hierarchical concepts may be applied either by: (i.) utilizing the results of the leaf nodes only, as depicted in FIG. 16A with the hierarchy 800, or (ii.) by utilizing the results from all nodes as depicted in FIG. 16B using the hierarchy 810. In hierarchy 810, it may be noted that the parent nodes $R_1$, $R_2$ and $R_3$ have been added to the ranking layer 528. The ranking layer may also rank partitions such that their activation is either soft or hard, thus allowing the hierarchical partitions to model probabilistic or deterministic concepts. In both embodiments, the result 530 may also contain an activation function such as softmax or sigmoid. An exemplary embodiment may be trained using standard gradient descent techniques such as back-propagation. Standard loss functions such as categorical or binary cross entropy may be applicable, however, custom loss functions may also be incorporated to achieve further optimizations.

FIG. 17 shows an exemplary embodiment of an XNN which makes use of a taxonomy for modelling the hierarchical partitions or hierarchical concepts. The example depicted in FIG. 17 makes use of the YAGO-SUMO taxonomy, however, any other taxonomy, ontology or knowledge graph may be used for modelling the hierarchical concepts or partitions. Taxonomy links allow for building an explainable neural network (XNN) whereby the embedded knowledge mimic the structure as defined by a taxonomy. Human knowledge injection may also be incorporated to allow for custom links or adjustment which may be applicable for a specific use case. The XNN in FIG. 17 works by taking some input 750. The input 750 may be the result of a deep neural network, such as a CNN, which could have been used for modelling the abstract concepts from raw input pixels. The input 750 is then passed to the combined conditional/prediction network 760. Such network is then used for finding the hierarchical weights, in a similar way to the XNN as depicted in FIG. 16a or FIG. 16b. The results for the hierarchy are them combined together in the ranking layer 770 of the XNN, which is responsible for selecting, merging or splitting the activations from all the hierarchical nodes. In a trivial implementation an additional layer 770 may be an activation or completely omitted. The final result is then sent to layer 780 which may be used for classification or prediction purposes, or for integration with larger deep neural networks, including other explainable neural networks (XNNs).

The XNN can thus be implemented in a way that there is the input layer 500, and a combination of the conditional network 510 and the prediction network 520, including the conditional layer 512, aggregation layer 514, switch output layer 516, feature generation and transformation layer 522, fit layer 524, prediction layer 526, and ranking layer 528 leading to the output 530. This combination may apply to all embodiments and implementations of the XNN, including both software and hardware implementations. The transformation capabilities of XNNs in this regard are unique and unparalleled in other neural network implementations since the white-box nature of XNNs allows flexibility and extreme merging to be performed without affecting the logical behavior of the XNN, although this affects various attributes of a practical implementation, such as size/space usage, performance, resource usage, trainability and overall throughput. It may be further contemplated that a hybrid neural network and transducer implementation, or logically equivalent white-box alternative, be used to combine parts of the XNN components without loss of functionality.

It may also be contemplated that the XNN architecture as shown in FIG. 12 may be implemented using fewer components. For instance, any of the components 509, 511, 512, 514, 516, 522, 524, 526, 527, 528 and 530 may be omitted, merged or split for optimization or implementation purposes. Furthermore, the input 500 may contain data which has already been transformed, pre-processed or partitioned, thus eliminating some components in the XNN. Similarly, the output 530 may contain further transformations which are not visible in the general XNN architecture. Exemplary transformations may include, but are not limited to de-convolutions, un-pooling, time-series components, decoding, and so on.

Linear methods such as linear regression may predict a target as a weighted sum of input feature variables. The linearity of the learned relationship facilitates interpretation. Linear models have long been used by statisticians, computer scientists and others who tackle quantitative problems. Linear models can be used to model the dependence of a regression target y on some features x. The following is the equation of a linear model:

$$y = \beta_0 + \beta_1 X_1 + \beta_2 X_2 + \ldots \beta_m X_m$$

Where y is the target variable and $X_1 \ldots X_m$ are the feature variables. $\beta_0$ is the intercept, and $\beta_1 \ldots \beta_m$ determine the importance (i.e. weight) of each variable X towards the target y.

In logistic regression, the target variable is a discrete value, which is why it is used for classification. The interpretation of the weights in logistic regression differs from the interpretation of the weights in linear regression, since the outcome in logistic regression is a probability between 0 and 1, and the weights do not influence the probability linearly any longer beyond 1. The weighted sum is transformed by the logistic function to a probability.

In binary classification, an exemplary equation for a logistic function may be:

$$y = \text{Sigmoid}(\beta_0 + \beta_1 X_1 + \beta_2 X_2 + \ldots \beta_m X_m)$$

where:

$$\text{Sigmoid}(x) = \frac{1}{1 + e^{-x}}$$

Referring now to exemplary FIG. 6, FIG. 6 illustrates a schematic flowchart of a linear regression represented using a neural network. Variables 602 may contribute to the output 604. Various weights 606 may increase or decrease the impact of each variable 602. The intercept 608 may also have an impact on the output, even though no variable is associated with the intercept 608.

Similarly, FIG. 7 may illustrate a schematic flowchart of a logistic regression represented using a neural network. Note the addition of the activation function such as sigmoid 702. The logistic regression neural network may implement variables 602 which may contribute to an output 604 and may be associated with various weights 606. In case of multi-class classification, softmax is typically used as the activation function. Activation functions are not limited to sigmoid or softmax. Any suitable activation function can be utilized to transform the output such as ReLU, and other functions.

Although linear methods are highly intuitive such as linear regression and logistic regression, they generally lack predictive performance for real world problems as they are only capable of modelling linear data. Some workarounds such as polynomial expansions can be applied to model non-linear data, but deep neural networks generally provide higher predictive performance on complex non-linear relationships.

Referring now to FIG. 8, FIG. 8 may illustrate the a linear fit and a polynomial fit on a scatter plot of random data. The linear fit line 802 may be a straight line going substantially across an average of the data, whereas the polynomial fit line 804 may curve along with the data in order to better represent the set of non-linear data.

When it is possible to fit data using polynomial features, the resulting model may be intuitive. In a standard neural network, modelling non-linearity simply involves adding multiple layers together with activation functions. This may be feasible, but the resulting model is a black-box and may not be explainable in an intuitive way.

Alternatively, if data can be modelled with something simpler such as a polynomial fit, polynomial transformations can be embedded within the neural network itself and simply apply linear/logistic regression following the transformations. The resulting configuration is considered a white-box. The architecture of XNNs allow other logically equivalent methods to be incorporated into its design seamlessly, for example using Fourier series transformations and other methods like chain models and stochastical process modelling that may be contemplated as being incorporated into the prediction network 520. It may be further contemplated that the XNN transform function may be a pipeline of transformations including, but not limited to, polynomial expansions, rotations, dimensional and dimensionless scaling, Fourier transforms, Walsh functions, state-space and phase-space transforms, Haar and non-Haar wavelets, generalized L2 functions, fractal-based transforms, Hadamard transforms, Type 1 and Type 2 fuzzy logic, knowledge graph networks, categorical encoding, difference analysis and normalization/standardization of data. It may further contemplated that the transformation function may utilize at least one of a (i) sub-neural network, (ii) gradient descent based method such as back-propagation, (iii) subsets of an explainable neural network. The transform function pipeline may further contain transforms that analyze sequences of data that are ordered according to the value of one or more variables, including temporally ordered data sequences.

Referring now to FIG. 9, FIG. 9 may illustrate an exemplary embodiment of a prediction network linear model 520. The linear model 520 may be represented by or mathematically equivalent to the following exemplary polynomial equation:

$$f(x,y) = \beta_0 + \beta_1 x + \beta_2 y + \beta_3 x^2 + \beta_4 y^2 + \beta_5 xy$$

An exemplary neural network, as shown in FIG. 9, is mathematically equivalent to the polynomial function f(x, y). An exemplary input layer 500 may be used. The XNN may include a feature generation and transformation layer 522 that contains polynomial transformation neurons as well as a concatenation or fit layer 524, whereby it may combine all polynomial features into one layer. The feature generation and transformation layer 522 may produce a set of variables which are of relevance to the output. The fit layer 524 may produce the set of coefficients ($\beta_0$–$\beta_5$ in the example shown in FIG. 9) which weigh the variables obtained in the feature generation and transformation layer 522. Finally, the coefficients may be analyzed, and a value may be produced in the value output layer 526.

The feature generation and transformation layer 522 is used to implement any advanced transformations that may be applied to the input features and relevant data, such as non-linear transformations. In an exemplary embodiment where a polynomial transformation is being applied, polynomial transformation neurons may be utilized, which may model polynomial equations using a system of specially interconnected weights and neurons that enable a white-box approach to polynomial transformations. The fit layer 524 may be used to implement any model fitting and prediction methods including but not limited to linear and non-linear fitting methods, Fourier series, multi-dimensional Bezier curves, recurrence relations, causal operators, etc. The value output layer 526 combines the value answers together and ensures that they can be combined into a matched pair consisting of an answer together with its corresponding explanation.

Multiple such pairs may be generated if more than one partition has been selected by the XNN focusing step as determined by the conditional network 510. The XNN can be implemented to work completely in parallel, generating plausible answer and explanation pairs which are then filtered and selected at a later stage via the output of the conditional network 510. Both parallel and sequential implementations of the XNN are thus possible, as the implementation can be tweaked to the particular application domain and also to fit within the implementation constraints of the software or hardware system being utilized.

High-degree polynomials may successfully be used in order to model complex data, yet may, however, still be uninterpretable, as well as computationally intensive in a high dimensional space. An XNN may instead split the fit of the entire model into multiple smaller fits. This may be done through the concept of "partitions". A partition models a specific region within the entire model. Partitions can be overlapping or non-overlapping, depending on their configuration. In the case of overlapping partitions, some priority function may be used to determine which partition to activate, or alternatively, an aggregation function may be used to combine results from multiple partitions. The process to identify partitions may be part of the initialization process of the XNNs. The initialization of partitions may be done using either an external or integrated process which may utilize deep learning in an end-to-end or partial manner. Standard loss functions such as mean squared error and binary/categorical cross entropy are applicable to XNNs. It may be further contemplated that a custom loss function may also be applied to XNNs such that it minimizes overlaps between partitions and minimizes the error between the prediction and the labeled output.

Hierarchical partitioning techniques or other logically equivalent methods can be used for identifying suitable partitions, such as an XAI model induction method which may input a set of training data to a black-box system, and analyze the corresponding output using a partitioning function. The partitions may be initially created as part of the XNN by an external process that creates the initial XNN, such the previously described model induction method. Alternatively, partitions may also be pre-trained or suitably initialized from a linked taxonomy or ontology that provides suitable partitioning information. However, once created, the XNN can use gradient descent methods to fit or further refine the partitions if desired. The XNN partitions may either be locked by having their values set as static values that cannot be changed, or can be movable dynamically for each backward training pass using standard back-propagation and related techniques. The hierarchical partitions may model data at different levels of abstraction. Such abstraction may be required when generating explanations. FIG. 13 shows an exemplary embodiment whereby only the leaf nodes/partitions are used for the purpose of ranking partitions in step 528. In another alternative embodiment as shown in FIG. 14, all nodes in the hierarchy may be used within the ranking layer 528. It may be contemplated that both XNNs in FIG. 13 and FIG. 14 may be logically equivalent, depending on the implementation of the ranking function 528, which determines how to select, merge or split the overlapping or non-overlapping partitions. It may be further contemplated that the hierarchical nature of the XNN partitions may be used to represent symbols and concepts at different levels of semantic and semiotic detail.

Additionally, the white-box nature of XNNs allows for additional ways of changing the partitions and values using techniques such as Genetic Algorithms and Monte Carlo Simulation Methods, or via Casual Logic and Simulation techniques. These additional ways are not normally available for standard neural network implementations due to their black-box nature, giving a distinct advantage to XNNs. The XNN partitions may be hierarchical rather than just a flat partition. (However, flat partitions may be encompassed by the definition of a hierarchical structure. As such, flat partitions may be supported as a sub-set of hierarchical partitions where there is just a single level.) The utilization of a hierarchy allows for more expressive explanations to be generated that more adequately models the expected nature of a good explanation.

Various standards as to what may be contemplated to be a "good explanation" may exist. In an exemplary embodiment, the DARPA XAI Program literature may be used as an example of an objective guideline for the features of a good explanation. In the DARPA XAI concept, it may be contemplated that an explainable AI system may comply with the desired goals of the XAI concept if the user can answer the questions "why did you do that?," "why not something else?," "when do you succeed?," "when do you fail?," "when can I trust you?," and "how do I correct an error?". XAI contemplates that clarity of the explanation and utility of the explanation may be balanced against one another, with explanations that are too superficial for detailed analysis and explanations that are too detailed and complex for a user to make a useful decision based on the explanation both being ineffective from a user satisfaction standpoint. Since appropriate levels of clarity and utility may vary based on the user and based on the intended application, it may readily be contemplated that a hierarchical, multi-level explanation that can selectively hide or show parts of an explanation or dynamically expand or shrink it is a superior type of explanation to a simple flat level explanation. Conformity to other standards other than the XAI guidelines may likewise be contemplated, such as may be desired.

XNNs ensure that the best practices in explanation encoding, transmission and eventual conversion to a human-readable or machine-readable higher-level domain specific explanation are fully supported. Multiple hierarchical partition techniques exist that may be utilized for XNN initialization including hierarchical partitioning, lazy clustering, agglomerative clustering, divisive clustering, relocation partitioning, probabilistic clustering, k-mediod methods, k-means methods, fuzzy clustering, density based clustering, grid based methods, gradient descent based methods, evolutionary methods, region splitting, region growing, subspace clustering, projection methods, co-clustering methods, lazy clustering methods, etc. The number of partitions generally depends on the overall complexity of the original predictor model or the underlying dataset—the more complex, the more partitions one typically creates. Multiple partitions may be connected with a "switch". The switch may determine which partitions to activate through the binary values. The resulting switch is then multiplied with the linear output.

XNNs may be designed to work with different non-linear transformations, including but not limited to polynomial expansion, Fourier transforms, continuous data bucketization, causal operators, and so on. Conditional features may also be applied. XNNs can also apply intelligent merging and summarization of partitions at multiple levels of detail, while also catering to some scale and rotational invariances whenever possible. Adjacent partitions in multi-dimensional space that have a possible fit in multi-dimensional space which summarize one or more partitions more efficiently will get an associated summary that may be more amenable to explanation generation.

Scale invariance may be accounted for by appropriate coefficients which adjust the scale in multiple dimensions. Rotational invariance is accounted for by having appropriate rotational coefficients that adjust rotation in multiple dimensions. This is a powerful feature of XNNs that enables non-linear data to be explained in a superior manner than methods that simply use linear methods exclusively. For example, if multiple partitions representing a rotated elliptical boundary exist in the XNN model, these partitions can be merged into a single representation of a rotated ellipse, giving a precise yet highly summarized representation of potentially complex boundaries that may be voluminous to describe using linear fitting. The resulting summary explanation is also more accurate than could be achieved using linear fitting and also follows the widely accepted principle that a shorter explanation is preferred over a longer explanation whenever available.

Referring now to FIG. 10, FIG. 10 may illustrate a schematic diagram of a conditional network 510. The input 500 of the conditional network 510 may be the same input as used in the linear model 100. In another embodiment, the conditional network may be eliminated thus resulting in a model with just one global partition. In another alternative embodiment, the hierarchical partitions or clusters may be integrated within the prediction network, thus having a hierarchical structure of predictions. The exemplary schematic diagram of a conditional network 510 is an expanded possible implementation of the conditional network 510 shown in FIG. 5. The conditional network 510 may include three main layers that can be combined together depending upon the implementation constraints. The first of these may be the conditional layer 512, which is initialized according to the hierarchy of partitions being implemented in the XNN. The second of these may be the aggregation layer 514, which is initialized for the first time by the external process that defines the XNN and can be subsequently refined using backward pass training methods such as gradient descent methods, etc. The third of the main layers may be the switch output layer 516 that combines the results of the aggregation layer 514 and conditional layer 512 together.

The switch output layer 516 is also initialized by the same external process that defines the XNN and is typically implemented as the same process that initializes the aggregation layer 514, although it may be contemplated that these processes may be independent if necessary. All values in the connection weights between the neurons can be updateable using standard neural network training techniques. XNNs provide a further novel method of updating the connections themselves using machine learning methods such as genetic algorithms, Monte Carlo simulation methods, simulated annealing, reinforcement learning, etc. or via causal logic models.

The partitions in the example presented in FIG. 10 represent four conditions:

$S_0 = x \leq 10$ $S_1 = x > 10 \land x \leq 20$ $S_2 = x > 20 \land y \leq 15$ $S_3 = X > 20 \land y > 15$ Each condition may be split into partitions. Each box in the conditional layer 512 may represent a single partition. For example, "y>15" may be a single partition, representing a single rule which applies where "y>15" (and, thus, not in the alternative case where y≤15). Then, the partition may be combined with another partition in the aggregation layer 514. In the aggregation layer 514, the partition "y>15" is combined with the partition "x>20". These two partitions are then combined to create $S_3$, in the switch output layer 516.

Referring now to FIG. 11, FIG. 11 may illustrate an exemplary XNN architecture which combines the results from the switch output layer and the value output layer. The example depicted in FIG. 11 is logically equivalent to the following exemplary ruleset:

$$f(x, y) = \begin{cases} \text{Sigmoid}(\beta_{0,0} + \beta_{1,0}x + \beta_{2,0}y + \beta_{3,0}x^2 + \beta_{4,0}y^2 + \beta_{5,0}xy), & x \leq 10 \\ \text{Sigmoid}(\beta_{0,1} + \beta_{1,1}x + \beta_{2,1}y + \beta_{3,1}x^2 + \beta_{4,1}y^2 + \beta_{5,1}xy), & x > 10 \\ \text{Sigmoid}(\beta_{0,2} + \beta_{1,2}x + \beta_{2,2}y + \beta_{3,2}x^2 + \beta_{4,2}y^2 + \beta_{5,2}xy), & x > 20 \land y \leq 15 \\ \text{Sigmoid}(\beta_{0,3} + \beta_{1,3}x + \beta_{2,3}y + \beta_{3,3}x^2 + \beta_{4,3}y^2 + \beta_{5,3}xy), & x > 20 \land y > 15 \end{cases}$$

The result may be found following the activation function 1120. The results combination may be obtained via a suitable transformation function or activation function. The transformation function or activation function may be applied either: (i.) on the predicted value as shown in step 527, and/or (ii.) on the result of the XNN output layer 530. The exemplary architecture in FIG. 11 may begin with an input 500. The input may then be used as inputs to the conditional network 510 and the prediction network 520. As illustrated in FIGS. 5 and 9, the prediction network may contain a feature generation and transformation layer 522, a fit layer 524, and a value output layer 526. The value output layer 526 may provide the result of the equations which correspond to rules which weigh different features of the inputs. The result 526 is combined with the switch output 516. The combined result 1116 may contain results from one or more partitions. One way to combine the results 1116 is to utilize element-wise multiplication. Some ranking function or merge function may then be used to calculate the result 1118. Further, the input 500 may be used as input to the conditional network 510, as illustrated in FIG. 5 and FIG. 10. Again, the conditional layer 512 and aggregation layer 514 may produce conjunctive rules or other logical equivalents or partitions which are represented in the switch output layer 516.

The outputs of the value output layer 526 and the switch output layer 516 may be combined in the output layer 530. Once the output layer 530 has been formed, a sigmoid or other activation function 1120 may be applied to the result 1118, depending on the application.

In another exemplary embodiment, as shown in FIG. 15, the prediction network 520 may incorporate hierarchical concepts when combined with the conditional network 510. For example, the image or concept of a dog may be the input 700 to the AI system. In an exemplary embodiment, concepts may be extracted with a deep neural network such as a CNN network. For the example in FIG. 15, the AI system may use an image classification algorithm. The AI system may classify the input image by applying a set of rules to the image and determining whether the rules are satisfied or not. For example, the rules may be implemented in a hierarchical structure, although a linear or other structure may also be utilized in a practical implementation. An exemplary embodiment may first analyze a portion of the dog, such as the legs 702. $R_1$ may be a rule which is triggered when an object with 4 legs is detected. Since $R_1$ was triggered by the input image, the system may then be directed to apply rules $R_2$ and $R_3$ to the input image. Rule $R_2$ may be a conditional rule which may be triggered by the appearance of a tail 704. The rule may be stored or formulated in the disjunctive normal form (DNF). Rule $R_2$ may be triggered by conditions such as a thin object which protrudes from another, thicker object of the same or a similar color (the body) which also satisfy $R_1$ (the rule which identified the legs). Once rule $R_2$ has been satisfied, the AI system may be directed to rules $R_4$ and $R_5$. Rule $R_4$ may identify the snout 706 of the dog. It may be triggered by multiple conditions, such as the detected presence of a rounded nose, eyes, and a mouth resembling that of other dogs. Rule $R_5$ may be an additional rule which is triggered by the presence of a collar 708. Rule $R_5$ may not be necessary for the classification, however, $R_5$ may increase the chances that an accurate classification was made. Similarly, additional rules may be implemented to identify features such as the eyes 714, mouth 712, or ears 710. The XNN network may utilize gradient descent techniques such as back-propagation to find the values of $R_1$ to $R_7$. The resulting values of $R_1$ to $R_7$ may act as probabilistic values such that the resulting classification is the argmax of $R_4$, $R_5$, $R_6$ and $R_7$.

XNNs may present an intuitive way to construct interpretable models, while still utilizing the power of ANNs and related methods such as deep learning. Once the model is trained through back-propagation or a similar method, the resulting neural network can be used to serve predictions and the inner structure of the XNN can be used to construct the rules.

The resulting explanation from the XNN can be represented using a universal explanation format. The explanation can then be processed further to give a human readable explanation that is suitable for whatever domain application the XNN is being used for.

An advantage of XNNs is that their interpretability can be preserved when embedded within other, larger systems. XNNs can form a single module or layer within a larger neural net—as long as the explanation outputs are preserved, the resulting network will also be a white-box model. If the explanations are not carried over and preserved within the network, then the resulting model may no longer be a pure white-box. Output from a black-box AI system can be used as input to an XNN, such as one that has been created by a model induction method, without changing anything. Output from the XNN model can be used as input to one or more XNNs, or to another AI system that is receiving the XNN output. If the receiving AI system is a white-box system, this preserves the white-box properties of the combined system. If the receiving AI system is a black-box system, the system may be partially black-box. Since XNNs can preserve explainability data even when chained, various implementations may be possible.

XNNs can also be transformed to optimize their architecture for speed, performance, trainability, resource usage or a combination of these or other different factors. The white-box nature of XNNs allows such logical transformations to be applied, something that is impossible to do with standard ANNs and Deep Learning methods.

XNNs may be compatible with a universal format for explainable AI (XAI) explanation encoding and transmission. XNNs may also be compatible with explainable technologies, such as induced XAI models, interpretable neural networks (INNs), explainable transducer transformers (XTTs), explainable spiking nets (XSN), explainable memory nets (XMN), and the like, as well as reinforcement learning applications where they may be compatible with explainable reinforcement learning (XRL).

It may be contemplated that, depending on the results of the induction method used to create the XNN, an XNN may be a type of white-box Wide Neural Networks (WNNs). WNNs complement the mainstream black-box Deep Neural Networks (DNNs) and provide significant advantages over DNNs. Independent analysis of WNNs in (Zagoruyko and Komadikis, 2017) shows that WNNs may significantly outperform logically equivalent yet much more structurally complex DNNs by magnitudes of order, and also WNNs may be several times faster to train than DNNs. XNNs may provide both these two additional advantages, and our initial experimental results from XNN implementations strongly indicate that these advantages are applicable to most XNNs.

XNN nodes can also be linked to a taxonomy system to achieve taxonomical links and knowledge to be seamlessly incorporated and added at various steps in the process, to achieve fusion of human and machine knowledge while providing a link to causal logic and further generalization and induction of new knowledge.

XNNs can also be used for bias detection in the input data and/or the resulting model. The global nature of XNNs can also be used to detect areas of strength and weakness in the underlying data training set. XNNs can thus allow interactive and directed feedback from the AI system to humans in the collection of future training data by identifying gaps and weaknesses that need to be addressed.

The following are a few example embodiments of XNNs which may be different exemplary embodiments of XNNs:

Convolutional XNNs (CNN-XNNs) allow convolutional layers to be seamlessly integrated with XNNs, giving them the capability of processing images, 3D data and other signal processing that is amenable to convolutional feature identification, transformation and extraction. CNN-XNNs may incorporate a set of one or more convolutional layers as part of a pre-processing step between the input features and the input to the conditional and prediction networks of an XNN. The original features together with the output from the convolutional layers are both treated as input to the XNN. The convolved features may also be used in conditions placed in the conditional layer. The output from the convolutional layers may also be dimensionally reduced and also potentially partially or fully deconvolved. The convolutional filters or kernels may be used in the generation of an appropriate explanation in an intuitive and human readable manner.

Example applications of CNN-XNNs involve image interpretation and diagnosis explanation of X-Ray and MRI images in medical devices; LIDAR and stereoscopic image data explanation and fused vision-control model explanation in autonomous air, land, sea, underwater and space indoor and outdoor vehicles; object and event detection and explanation of images in various application domains such as traffic cameras, UAV and satellite imagery, social media network photos, etc. Most currently known image or video or 3D data-based applications of Artificial Intelligence can incorporate CNN-XNNs to add explanatory capabilities to such applications.

Capsule XNNs (CAP-XNNs) preserve hierarchical information captured during the convolution steps by a CNN-XNN. CAP-XNNs may thus be considered as an alternative variant to standard CNN-XNNs. CAP-XNNs add a capsule network in between the input layer and the condition and prediction layers in the XNN. CAP-XNNs are similar to CNN-XNNs but since the capsule network can also preserve hierarchical information, and XNNs utilize hierarchical partitions and hierarchical notions of explanations, such hierarchical information from the capsule network layers can be directly used by the XNNs. CAP-XNNs may thus offer different performance than CNN-XNNs due to the addition of hierarchical information. The example applications of CAP-XNNs are identical to CNN-XNNs. CNN-XNNs and CAP-XNNs are largely completely replaceable by each other, ensuring that a CNN-XNN can be swapped in for a CAP-XNN and vice-versa. The CAP-XNN combination is likely to be more computationally powerful and expressive due to the presence of hierarchical information. Alternative current and future enhancements to CNNs that add hierarchical information will also be compatible with XNNs, opening up possibilities of having other XNN options that are not based on capsule networks but some other variant on convolutional networks. As long as the convolutional aspect is kept, these variations may be implemented into an XNN.

Text XNNs (T-XNNs) are a variant of XNNs that can handle text processing and textual data including syntactic and semantic information. T-XNNs may include a processing step for the input features that transform text data into suitable vector representations, and may thus incorporate techniques like word2vec and end-to-end processing for textual feature engineering, and the like. T-XNNs may typically take advantage of the white-box nature of XNNs to optionally incorporate taxonomical knowledge and also external linguistic knowledge as part of both the conditional and prediction networks in the XNN. The incorporation of such knowledge may lead to an improvement in the T-XNN performance and also in its explanatory expressiveness.

T-XNNs may be typically combined with sequence processing in the XNN prediction network, such as the extensions described for Predictive and Recurrent XNNs (PR-XNNs). Example applications of T-XNNs are as part of a document understanding system; a machine document translation system; an information retrieval or other form of search engine system; a semantically based knowledge extraction and understanding system, as well as any other embodiments that have to do with text processing. T-XNNs also open up the possibilities of having better control and understandability of the resulting neural network models, which is a barrier to further improvement in traditional black-box neural networks. For example, a T-XNN can explain the learnt grammatical rules for a particular set of training documents, corpus, or input language, which can then be analyzed and improved collaboratively using a human review step. The initial grammatical rules may be learnt automatically using the T-XNN initialization process without human intervention. From the first review onwards, such reviews can then re-incorporate suggested edits into the T-XNN, allowing for a virtuous cycle of machine and human collaboration and semi-supervised learning to improve performance. T-XNNs support supervised, semi-supervised and unsupervised modes of learning. As T-XNNs are also still compatible with gradient descent and other neural network training methods, all the advantages of re-training are available for a T-XNN.

Speech XNNs (S-XNNs) are an extension of XNNs for speech recognition and generation, adding an explanation to speech recognition by inserting an XNN or alternatively using an induced model as part of the speech recognition solution. S-XNNs incorporate a speech model as part of a pre-processing step between the input features and the input to the conditional and prediction networks of an XNN. The original features together with the output from the speech model are both treated as input to the XNN. The speech model features may also be used in conditions placed in the conditional layer. The output from the speech model may also be dimensionally reduced and also potentially partially or fully encoded or decoded. The speech model data itself may be used in the generation of an appropriate explanation in an intuitive and human readable manner. Speech models may be in the form of a speech specific neural net or other form of machine learning model such as Bayesian networks, HMMs, and other models used in automated speech modelling. For speech generation, an S-XNN can, for example, be used to generate explanations of why a particular phoneme and intonation has been selected. S-XNNs can also be used to explain why particular interjections, fillers, non-lexical vocables and other breaks and irregularities have been inserted in the speech output to make them sound more natural. Example applications of S-XNNs are for automated speech recognition systems; automated speech generation systems; intelligent personal, home and office assistants; speech based control software and hardware systems, like those used to control a wide variety of industrial machinery and in transportation and aviation; speech control systems for pilots and future autonomous vehicle applications; speech based interfaces and agents; call center and telemarketing systems; telecoms hardware that utilizes automated speech recognition and generation; conversational and dialogue agent systems and the like.

Dialogue and Conversational XNNs (QA-XNNs) automate conversational, dialogue and question & answering (Q&A) systems in combination with XNNs. Given a specific question, an explainable neural network outputs the answer along with an explanation as to why such answer has been specified. QA-XNNs incorporate additional context in the conditional and prediction networks of an XNN to keep track of the current status of a conversation, dialogue or Q&A session. QA-XNNs may also incorporate multiple XNNs within an overall control loop structure or system that enables multiple iterative requests and queries to be executed over the duration of a user session. The XNN explanation coefficients for a QA-XNN incorporate state information and if used in an overall control loop system, some form of positional information to help generate an appropriate response to that particular loop or iteration in a session. QA-XNNs take advantage of the white-box nature of XNNs to incorporate additional context sensitive information especially in the prediction network in a seamless manner. It is contemplated that QA-XNNs will be used to replace existing neural networks in existing Q&A systems in a transparent manner. Due to the inevitable iterative and causal nature of QA-XNNs, it is contemplated that QA-XNNs will be combined with Predictive and Recurrent XNNs (PR-XNNs) and Causal XNNs (C-XNNs) in a number of practical embodiments. For most applications, QA-XNNs will also be used in conjunction with T-XNNs, unless the input features for the QA-XNNs have already been processed by some other separate system that has encoded semantic attributes and knowledge, etc. Example applications of QA-XNNs include an automated chatbot system such as those used for automated reservations and assistance; interactive expert systems and search engine systems; and in applications where the reason underlying a particular answer needs to be further explained. The advantage of using a QA-XNN is the addition of the capability of the implementation to be capable of answering questions that refer to why a particular answer has been given by the system, allowing for better interaction between people and machines and also enabling a better understanding to form as a direct consequence. Feedback from this process can also be used in subsequent re-training and refinement processes to make Q&A systems that utilize QA-XNNs to improve their accuracy and usefulness at a faster accelerated rate than other systems that do not utilize explanations as part of their improvement and training pipeline.

Predictive and Recurrent XNNs (PR-XNNs) add an element of time and or sequence to the input and to the output. Such XNNs can match an input sequence and identify its trend while outputting and forecasting possible outputs together with the explanation for each possible output. Such XNNs may utilize recurrence in the explanation and have parts of the explanation refer to itself in a modular manner. The specific type of predictive architecture may give rise to different variants of PR-XNNs, for example a long short-term memory unit (LSTM) PR-XNN or a gated recurrent unit (GRU) PR-XNN.

PR-XNNs add contextual positional information in the conditional and prediction networks of an XNN. This contextual positional information may also form part of the output if required, depending upon the specific application and implementation. The contextual positional information may also be added to the matched answer and explanation pairs, as it may be necessary to precisely distinguish PR-XNN output as part of a sequence of output items rather than a single output item.

PR-XNNs are contemplated to typically have some form of recurrence relations in the prediction network, and to a lesser extent may also need recurrence relations in the conditional network. The recurrence relations are learnt during the PR-XNN initialization step from the original predictor model. For example, if the original predictor model is an LSTM network, the recurrence relations may reflect the LSTM behavior as part of the underlying explanation given by the PR-XNNs.

It may be contemplated that a practical implementation will either completely replace the original model, so in the example case, the LSTM model may be implemented as part of the prediction network of the PR-XNN; or alternatively, the original predictor may be placed either before or after the input layer of an XNN. When the original predictor is placed before the input layer of an XNN, the resulting PR-XNN will treat the output of the original predictor as a sequence of input features, just like any other black-box predictor model that is induced to a white-box XNN. When the original predictor model is placed after the input layer of an XNN, the resulting PR-XNN will have an extra data that ensures that any explanation coefficients are passed through the predictor model. For example, if an LSTM is placed in between the input layer and the conditional and prediction networks of an XNN, or an LSTM is incorporated as part of the prediction network of an XNN, the LSTM model needs to pass through the explanation coefficients in order to make sure that the resulting PR-XNN is still a white-box. This passthrough innovation allows a PR-XNN to remain a white-box even if an element in its prediction is effectively a black-box or a grey-box with a mix of white-box elements and black-box structure.

PR-XNNs can also incorporate an LSTM or similar model after their output layer, allowing the LSTM to learn to predict the explanation itself. It may be contemplated that similar models, such as RNNs, Transformer, Bayesian Networks, Markov Models and other suitable models may be utilized instead of an LSTM. Such a combination of LSTMs or other similar models with PR-XNNs can lead to efficient new systems that not only generate an explanation from a single data item and/or ordered or unordered sequence of data items, but also be capable of predicting possible explanations. This capability of PR-XNNs makes them particularly suitable for industrial applications that need to anticipate the consequences of planned actions prior to actually executing them.

For example, in an industrial robotics manufacturing application involving a robot arm, the predicted explanations for a set of movement commands can be used to determine whether such movement commands will lead to an unsafe situation for any human operators, living objects or inanimate equipment that may be in the proximity of such robotic arm. PR-XNNs can thus open up a new set of capabilities in industrial and commercial and non-commercial applications that allow safety to be part of the control loop of automated machinery, apparatus and systems.

Another example of the practical implementation and advantages of a PR-XNN is to anticipate the behavior and subsequent consequences of an autonomous vehicle including but not limited to autonomous air, land, sea, underwater and space indoor and outdoor vehicles. Using a PR-XNN, an autonomous driverless car, for example, may determine that in one of its anticipated future explanations there is a reference to a child or adult being potentially hit by the driverless car. When the safety control system in the driverless car detects such anticipated references, it may take an appropriate safety related action, such as to switch the car to a safer driving mode, or slow down, or turn on some higher resolution sensor to better resolve the future possibilities prior to them actually happening. PR-XNNs may allow practical systems to safely operate automated machinery based on the anticipation and prediction of consequences. The ability to guarantee a safe mode of operation of machinery and robots, especially machinery and robots which interact with people, is a major unresolved problem which PR-XNNs may solve to a large extent.

Video XNNs (V-XNNs) are a combination of CNN-XNNs and PR-XNNs whereby a sequence of images (frames) are used to predict, anticipate and explain what is likely to happen in future frames. This combination may be common enough to warrant an explicit variant of XNNs to make implementation easier by re-using best practice implementations. Video XNNs are not limited to 2D video. A 3D data stream processed by the CNN-XNN will enable the XNNs to process and explain 3D data such as stereoscopic videos, LIDAR data, RADAR, SONAR, and the like. V-XNNs incorporate a CNN-XNN generally prior to the input for a PR-XNN, thus having the CNN-XNN acting as a pre-processing step for the input to the PR-XNN. The PR-XNN output may also be incorporated in a feedback loop that goes back to the CNN-XNN. Sensor data, such as 2D or 3D video, will generally be fed into the CNN-XNN. It is contemplated that alternative arrangements such as a PR-XNN followed by a CNN-XNN and a subsequent second PR-XNN can also be useful in a practical implementation of a V-XNN. V-XNNs can also be used to process non-video data efficiently, for example, stock price information or time-series data as long as there is a defined sequence and ordering to the input information.

Example applications of V-XNNs would be in medical devices that perform continuous scans of a patient, such as during operations involving fluoroscopy equipment that constantly scans patients with X-Rays while a surgeon is operating. V-XNNs in such a situation may provide quasi-realtime feedback to the surgeon of any diagnosis together with its explanation, which is important especially in a time critical situation like a surgical intervention. Another example application of a V-XNN is during troubleshooting of industrial machinery, where scans are being constantly taken and anomalies need to be detected. Subsequent interventions and troubleshooting steps will force the system to adapt its answers and explanations to new situations, with the resulting explanations making V-XNNs a more suitable solution than other solutions that do not give an explanation.

It may be contemplated that V-XNNs may be combined with other XNN variants like a QA-XNN to implement interactive solutions that need to have situational awareness combined with interventions and actions that affect the physical world, enabling the system to adapt to changing circumstances while all the time maintaining its capability to explain itself. Combining such a system with a PR-XNN also gives it the capability to anticipate the future to some extent, giving it further useful capabilities that are beyond the scope of current black-box neural network-based systems.

Explainable Generative Adversarial Networks (XGANs) extend the XNN architecture concept to Generative Adversarial Networks (GANs) enabling explanations to be generated, processed and be incorporated in the encoding and decoding processes. XGANs utilize XNNs instead of standard neural networks giving rise to explainability for both the generator and the discriminator. An XGAN utilizes an XNN in either the generator or discriminator or in both parts of a GAN system. The advantage of an XGAN over a standard GAN is that the explanation information present in an XNN becomes available in a generative adversarial system, allowing the XGAN to have more complex behavior beyond what a GAN can do. For example, in an XGAN application that tries to detect anomalies efficiently over a telecoms network by generating potential examples of anomalous situations, the explanations can be used by the discriminator to distinguish between true and false alarms more efficiently than in the case when no explanations are available.

A reinforcement learning (RL) training method can utilize XNNs to create an Explainable Reinforcement Learning Model (XRL). The XRL may include the generation of explanations in the action plan and world model components of the RL system. The XRL may use the explanations themselves as part of the cost and reward functions. XRLs can be extended to the entire class of techniques based on agent-environment interactions, for example those that are based on Markov decision processes, game theory and also partially observable Markov decision processes. XRL may use the explanation information as part of the feedback, error, reward, cost, state space, action space, etc. Example applications of XRL would be in robotics, where XRLs may utilize the explanation information to anticipate safety issues and minimize or prevent unsafe operation modes; in vehicle traffic control, XRLs can utilize explanations about the anticipated behavior of vehicles to ensure a better flow and throughput and anticipate potential risks of accidents and bottlenecks more efficiently while also being extensible to a mix of human and autonomous traffic; in resource logistics and planning, XRLs can utilize explanations about the actions of the various agents involved for example in a warehouse to optimize the behavior of autonomous systems such as autonomous forklifts. Explanation information may be critical in such situations to avoid erroneous or potentially illogical actions being taken by such automated systems leading to errors that humans would typically never do, for example by trying to pack a box that has accidentally fallen onto the floor without attempting to pick it up again. An XRL faced with such an explanation would modify the action plan to include a sequence of commands to re-attempt to pick up the box before proceeding with the rest of the plan, altering the cost analysis along the way to accurately reflect the change in the world situation.

Explainable Auto-Encoders (XAE) and Auto-Decoders (XAD) can extend the XNN architecture concept to auto-encoders and auto-decoders. Thus, explanations may be generated, processed and be incorporated in the encoding and decoding processes. An XAE or XAD system may utilize the XNN explanation output as part of its auto-encoding or auto-decoding processing pipeline, giving the system additional capabilities beyond a standard auto encoding (AE) or auto-decoding (AD) system. For example, an XAE system can utilize explanations to do more efficient dimensionality reduction and generalization of an input stream of data by taking the similarity of explanations into account. Other potential XAE/XAD applications are in information retrieval, where explanations can allow better vectorization of database entries for efficient indexing; in anomaly detection, where the explanations are used to better detect an anomalous situation from a non-anomalous situation; and in drug discovery systems, where XAE/XAD based methods will benefit from having an explanation of why a particular drug molecule is predicted to be more efficient than others drug molecules.

Casual XNNs (C-XNNs) extend XNNs to integrate with causal logic models giving the explanations the power of causality. C-XNNs can incorporate casual logic models as part of the prediction network in an XNN. Alternatively, XNNs and/or C-XNNs output may also be incorporated as part of the input in a causal logic model to form another variant of C-XNNs. C-XNNs can also utilize a causal logic model to create explanations that take causality into effect, thus providing an explanation that goes beyond a simple description of a particular scenario, opening up a new range of explanations that give a chain of cause-and-effect scenarios and reasons. C-XNNs are also capable of generating explanations that have a what-if but also a what-if-not nature. For example, a C-XNN can be used to generate a medical diagnosis for a particular condition but also explain the cause-and-effect of that diagnosis. Using the what-if-not capabilities of causal logics the resulting explanations can cover not just what the system has detected but also the reasons for exclusions of other potential symptoms or diagnoses.

It may be contemplated that a C-XNN can be combined with an XRL system to create systems that can anticipate and act in a physical (or simulated) world, explain themselves and also provide automatic input to the XRL simulation system that further improves the performance of the combined system as a whole. For example, a combined C-XNN and XRL system may be used in the previously mentioned warehouse application to detect that a particular type of box keeps falling from a forklift, then using the C-XNN to provide the right parameters to simulate the right amount of pressure increase or decrease or different change in the procedure commands for picking up such particular type of box, and then subsequently using the results of that simulation to update the XRL system. Real world feedback from the next similar case encountered would then lead to further iterative improvements, as happens similarly with humans as they learn from real life experiences. The combination of C-XNNs and XRL allows systems to explain themselves, learn from the explanations and the overlying causal model, and then adapt automatically with minimal or no supervision.

All of the above variants of XNNs remain compatible with the generic XNN architecture, meaning that they can be mixed and matched in various combinations as part of a larger and more sophisticated XNN. For example, a C-XNN can be combined with a CNN-XNN or a V-XNN to provide casual explanations for an autonomous vehicle.

FIG. 18 shows an exemplary embodiment how XNNs may be combined with other AI systems, in this case an exemplary CNN-XNN system. In this exemplary embodiment, the implementation works by taking some raw input pixels 900, which are then transformed through a number of layers such as convolution and pooling layers. The output of the CNN layers 910 becomes an input to the standard XNN architecture 920 by connecting the convolutional layers 910 with the XNN original input 500. The output of the XNN 530 may then be used for further processing or transformations. In the depicted exemplary embodiment, the output 530 is connected with the output layer 930. The output layer 930 may be used to transform the XNN output 530 further, for example, to make it compatible with some particular output device, or particular system utilizing said output, or as part of some appropriate transformation pipeline. In other exemplary embodiments, the output layer 930 may be used to connect the XNN within larger neural networks or suitable systems. In other exemplary embodiments, the output of the XNN 530 may be utilized by adding more layers and transformations including but not limited to de-convolutions, un-pooling, time-series components, decoders, and so on. In other exemplary embodiments, the output layer 930 may be omitted entirely and/or merged with the output of the XNN 530.

XNNs can also be used alone or in combination with other XNNs and variants of XNNs to utilize the resulting answers and their explanation(s) to act as a trigger(s) for a suggested action or set of actions in a general goal/plan/action system. Some XNN variants such as PR-XNNs are also capable of outputting an ordered sequence of triggers and/or suggested actions, making them highly suitable for goal/plan/action systems, robotic systems, RL systems, etc.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A system for an artificial neural network that is implemented by a combination of hardware and software and that is interpretable and explainable, comprising:
   an input layer which receives an input and identifies one or more input features;
   a conditional network, comprising:
     a conditional layer configured to model the input features based on one or more partitions, wherein each of the one or more partitions comprises a rule;
     an aggregation layer configured to aggregate one or more rules into one or more aggregated partitions; and
     a switch output layer configured to selectively pool the aggregated partitions from the aggregation layer with the one or more partitions from the conditional layer;
   a prediction network, comprising:
     a feature generation and transformation network comprising one or more transformation neurons configured to apply one or more transformations to the input features;
     a fit layer configured to combine features which have been transformed by the feature generation and transformation network to identify one or more coefficients related to at least one of: one or more features and one or more partitions;
     a value output layer configured to output a value related to at least one of: one or more features, one or more partitions, as applied to the one or more coefficients; and
   an output layer configured to generate an output which is interpretable and explainable by at least one of a machine program or a human;
   wherein each of the one or more rules is an if-then rule;
   wherein each of the one or more partitions forms at least one local model and a combination of local models forms a global model; and
   wherein one or more paths throughout the partitions are identifiable by an external process.

2. The system of claim 1, wherein the system is further configured to apply an additional transformation within at least one of: the prediction network before the fit layer, at the output, and within the conditional network before the conditional layer.

3. The system of claim 1, wherein the one or more paths include at least one of: one or more activation paths, a switch output selection path, an aggregation path, and a transformation path.

4. The system of claim 3, further comprising a ranking layer configured to identify a score for each of the one or more activation paths wherein the activation path(s) comprise one of a hierarchical and a flat structure.

5. The system of claim 3, wherein each partition is explainable and interpretable, such that each local model formed from the partitions is explainable and interpretable, and the global model formed from the combination of local models is explainable and interpretable, and wherein an explanation is formed with the output in a single feed forward step.

6. The system of claim 1, wherein the feature generation and transformation layer is configured to apply at least one of a linear transformation and a non-linear transformation, wherein the transformation functions comprise one or more of polynomial expansions, rotations, dimensional scaling, dimensionless scaling, Fourier transforms, integer/real/complex/quaternion/octonion transforms, Walsh functions, state-space transforms, phase-space transforms, Haar and non-Haar wavelets, generalized L2 functions, fractal-based transforms, Hadamard transforms, Type 1 fuzzy logic, Type 2 fuzzy logic, modal transforms, probabilistic transforms, quantum/qubit transforms, knowledge graph networks, categorical encoding, difference analysis, normalization, standardization, scaling, multi-dimensional Bezier curves, recurrence relations, causal operators, gradient descent based transformations, and subsets of an explainable neural network.

7. The system of claim 1, wherein the input is received on the conditional network and prediction network simultaneously.

8. The system of claim 1, wherein the partitions are hierarchically structured.

9. The system of claim 1, wherein the transformation layer is further configured to perform a plurality of transformations in a transformation pipeline.

10. The system of claim 9, wherein the transformation pipeline is further configured to perform transformations that analyze one or more temporally ordered data sequences according to the value of one or more variables.

11. The system of claim 1, further comprising at least one of a selection, ranking, split, and merge layer implemented at least one of before, in, and after the conditional network.

12. The system of claim 1, wherein the partitions are non-overlapping.

13. The system of claim 1, wherein the prediction network fits one or more local models, wherein each local model is linked to a specific partition.

14. The system of claim 1, further comprising a loss function applied to minimize or completely eliminate an overlap between partitions and to minimize an error between a prediction and a labeled output.

15. The system of claim 1, wherein each partition in the one or more partitions forms exactly one local model and a combination of more than one of the one or more partitions is a global model.

16. The system of claim 1, wherein the value output layer is configured to present at least one of a predicted value and a classification label based on the input features, and wherein the value output layer further includes an activation function.

17. The system of claim 1, wherein the system is further configured to form the partitions, based on the input, by comparing features from the input to a set of localization values and conditions, wherein the localization values and conditions are identified using an internal and/or external process.

18. The system of claim 17, wherein the internal and/or external process is a gradient descent method.

19. The system of claim 1, wherein human knowledge is embedded into the network.

20. The system of claim 1, wherein the system is further configured to apply one or more gradient descent methods to implement human knowledge and machine-generated knowledge into the partitions.

21. The system of claim 1, wherein the input data is an output from another neural network.

22. The system of claim 1, wherein the output is machine readable and is read by a subsequent neural network.

23. The system of claim 1, wherein one or more of the partitions overlap with one another, and wherein the system is configured to identify at least one of: a probability or ranking score for each partition, two or more partitions to merge, and one or more partitions to split.

24. The system of claim 1, wherein one or more of the partitions overlap with one another, and wherein the system further comprises a ranking function configured to rank the partitions and select the highest ranking partition when more than one overlapping partition is identified.

25. The system of claim 1, wherein the coefficients and/or partitions are formed based on at least one of human input, taxonomy information, and ontology information.

26. The system of claim 1, wherein the transformation transforms the prediction output using to be structured as one of: (i) hierarchical tree or network, (ii) causal diagrams, (iii) directed and undirected graphs, (iv) multimedia structures, and (v) sets of hyperlinked graphs.

27. A computer implemented method for providing an explainable neural network, comprising executing on a processor the steps of:
inputting a set of data into an input layer;
partitioning the input based on one or more input features identified in the input, creating one or more partitions;
aggregating one or more of the partitions;
applying one or more transformation functions to the partitioned input features, providing a set of transformed features;
combining the transformed features and identifying one or more coefficients corresponding to the transformed features;
compiling one or more equations based on the coefficients and the transformed features;
compiling one or more rules based on the equation and the partitions;
applying the equations and rules to the set of input features to obtain an output value;
outputting the output value and generating an explanation of the output value, wherein the explanation accounts for at least one of the coefficients;
wherein each of the one or more rules is an if-then rule;
wherein each of the one or more partitions forms at least one local model and a combination of local models forms a global model; and
wherein one or more paths throughout the partitions are identifiable by an external process.

28. The computer implemented method of claim 27, further comprising convoluting the set of data prior to inputting the set of data into the input layer.

29. The computer implemented method of claim 27, further comprising customizing one or more of the partitions based on human input.

* * * * *